Figure 1:
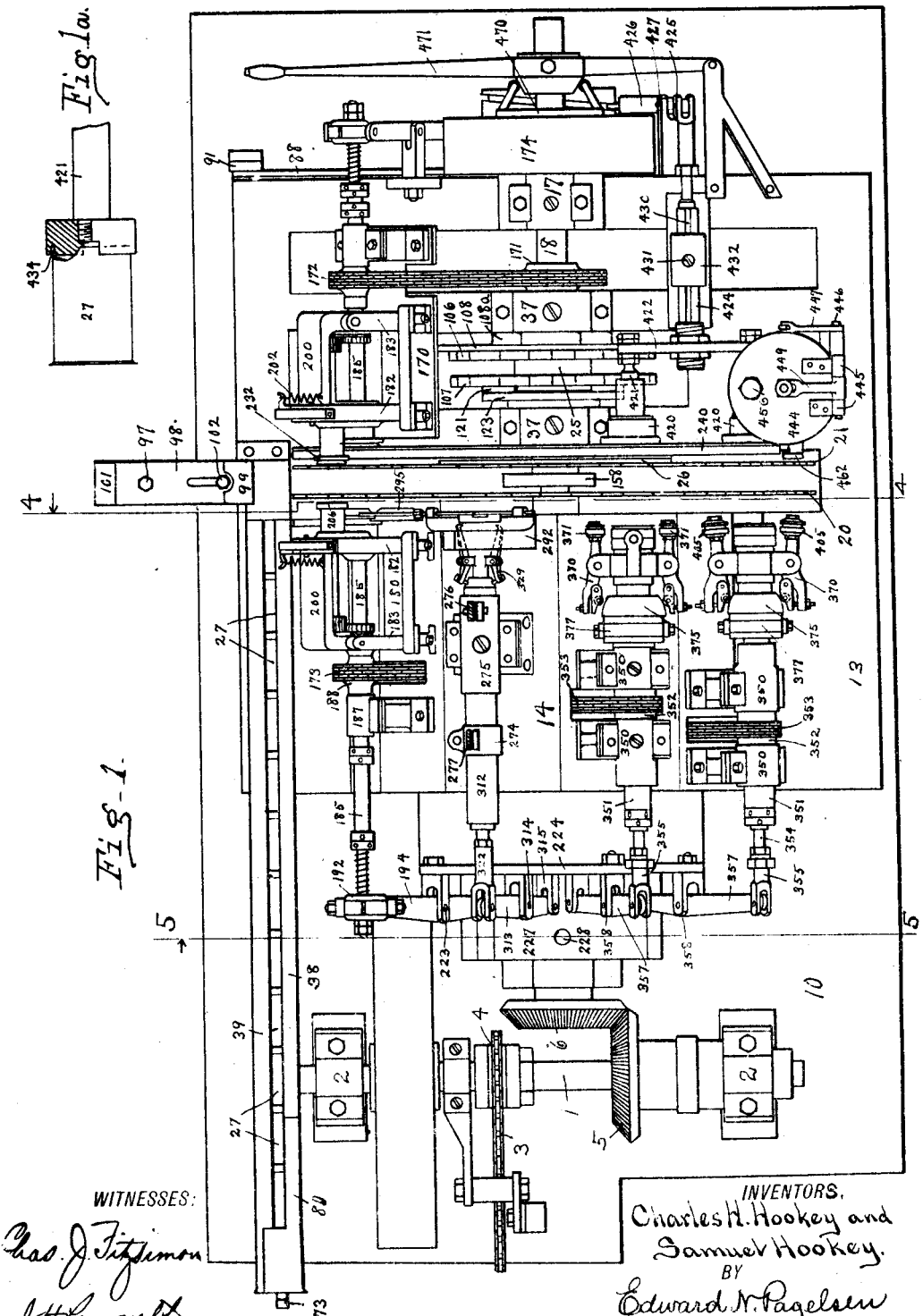

C. H. & S. HOOKEY.
CAN HEADING MACHINE.
APPLICATION FILED FEB. 21, 1913.

1,105,661.

Patented Aug. 4, 1914
21 SHEETS—SHEET 2.

WITNESSES:

INVENTORS
Charles H. Hookey and
Samuel Hookey
BY
Edward N. Pagelsen.
ATTORNEY

C. H. & S. HOOKEY.
CAN HEADING MACHINE.
APPLICATION FILED FEB. 21, 1913.

1,105,661.

Patented Aug. 4, 1914.
21 SHEETS—SHEET 5.

WITNESSES:
Chas J. Fitzsimans
J. H. Perrault

INVENTORS
Charles H. Hookey and
Samuel Hookey,
BY Edward N. Pagelsen
ATTORNEY

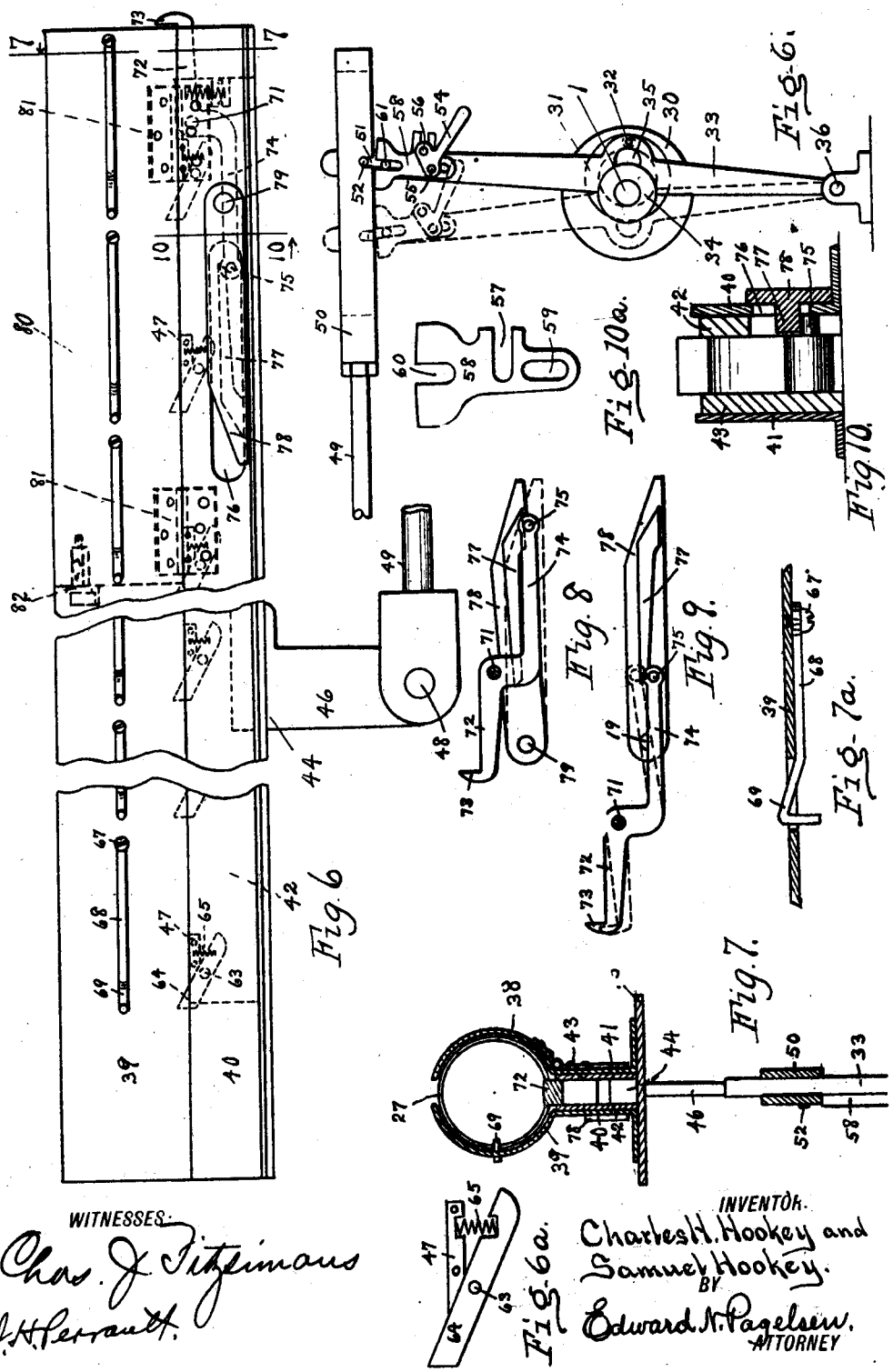

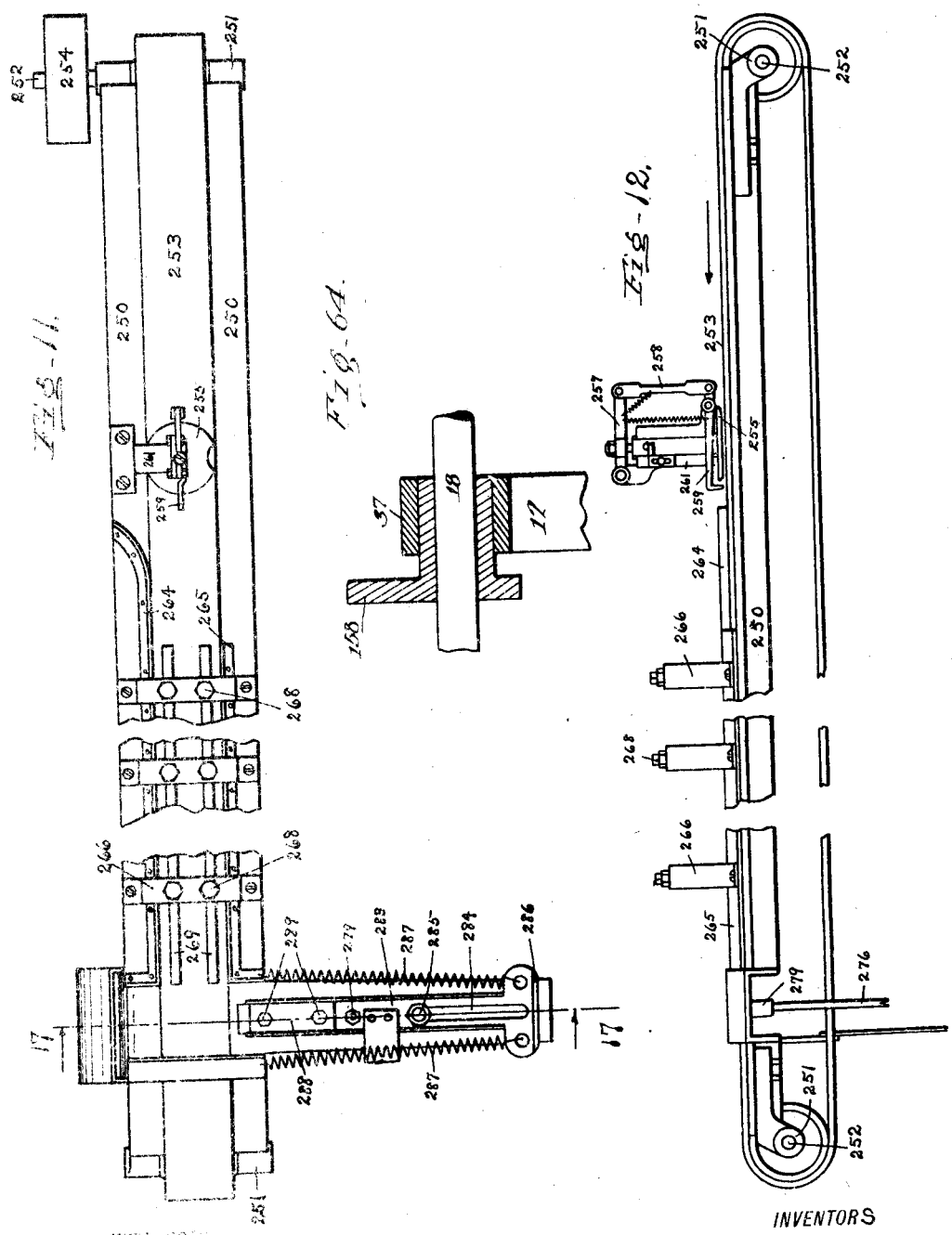

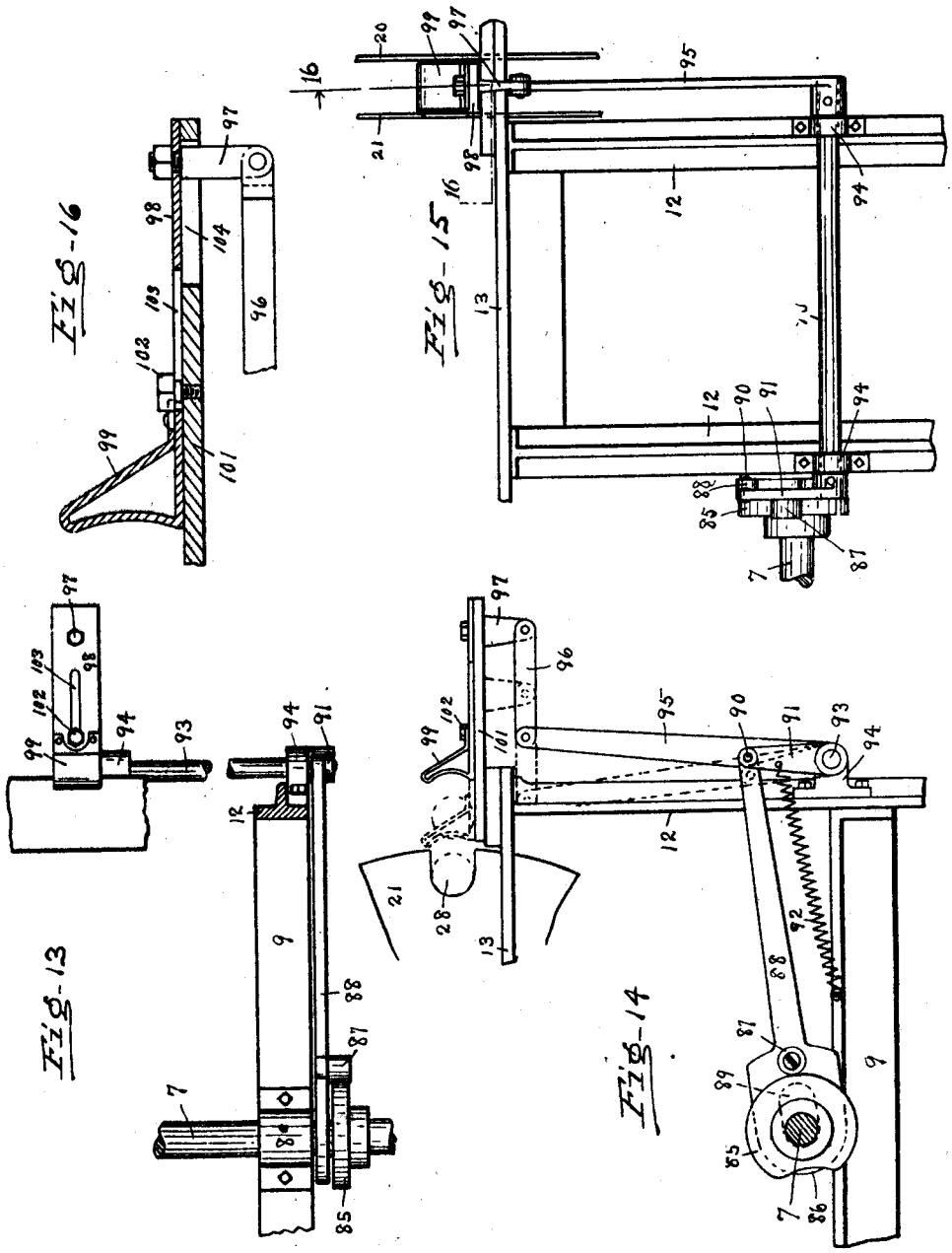

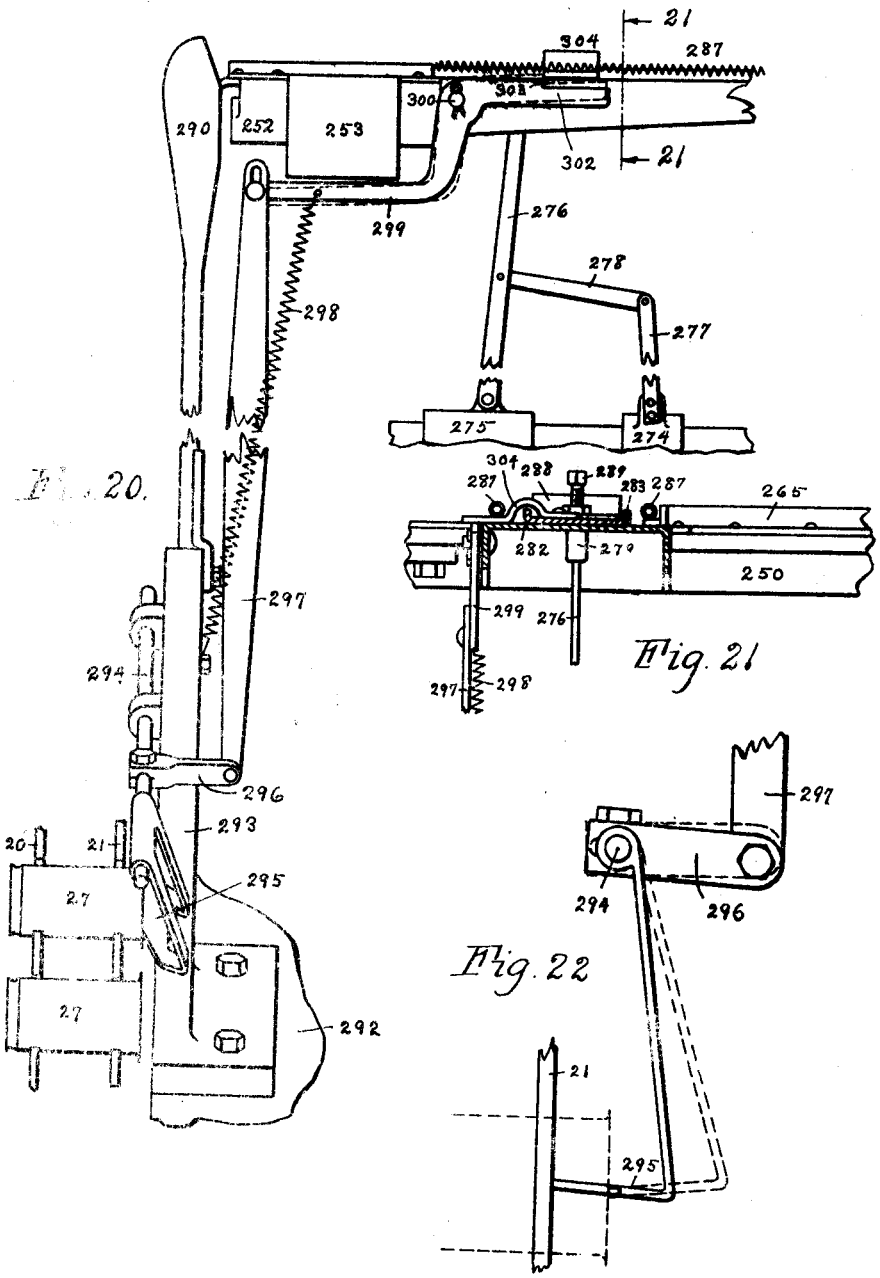

C. H. & S. HOOKEY.
CAN HEADING MACHINE.
APPLICATION FILED FEB. 21, 1913.

1,105,661.

Patented Aug. 4, 1914.
21 SHEETS—SHEET 11.

WITNESSES:

INVENTORS
Charles H. Hookey and
Samuel Hookey
BY
Edward N. Pagelsen,
ATTORNEY

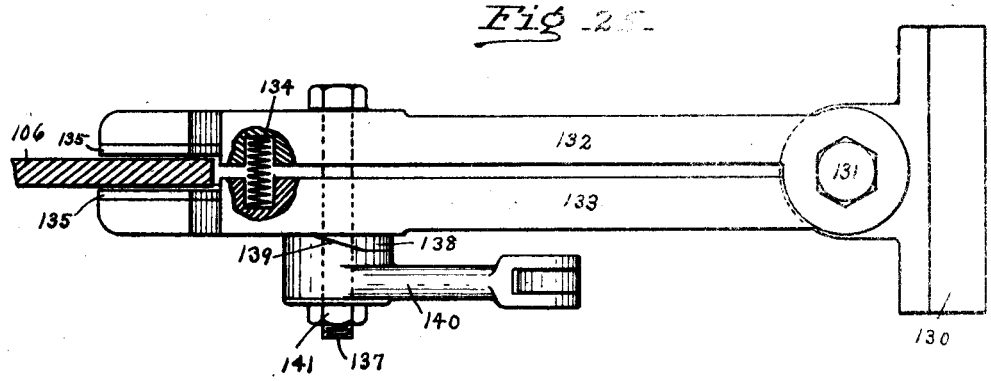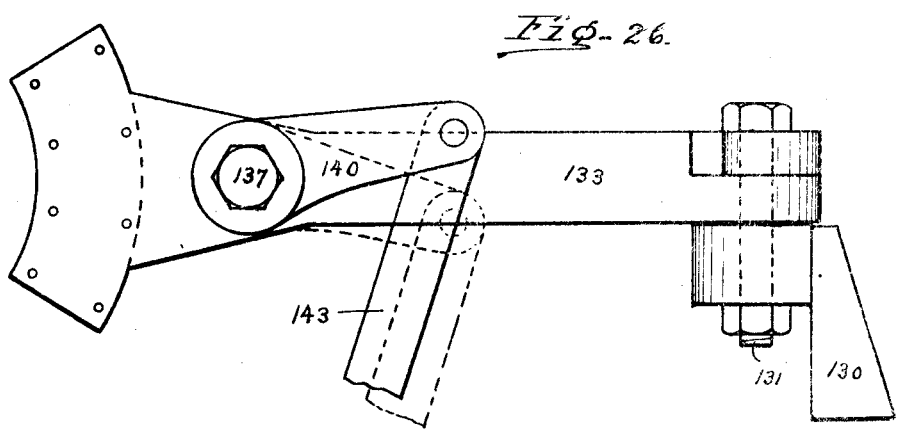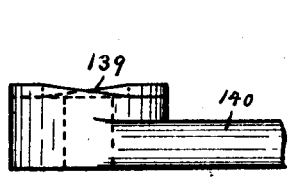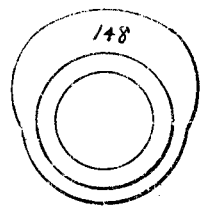

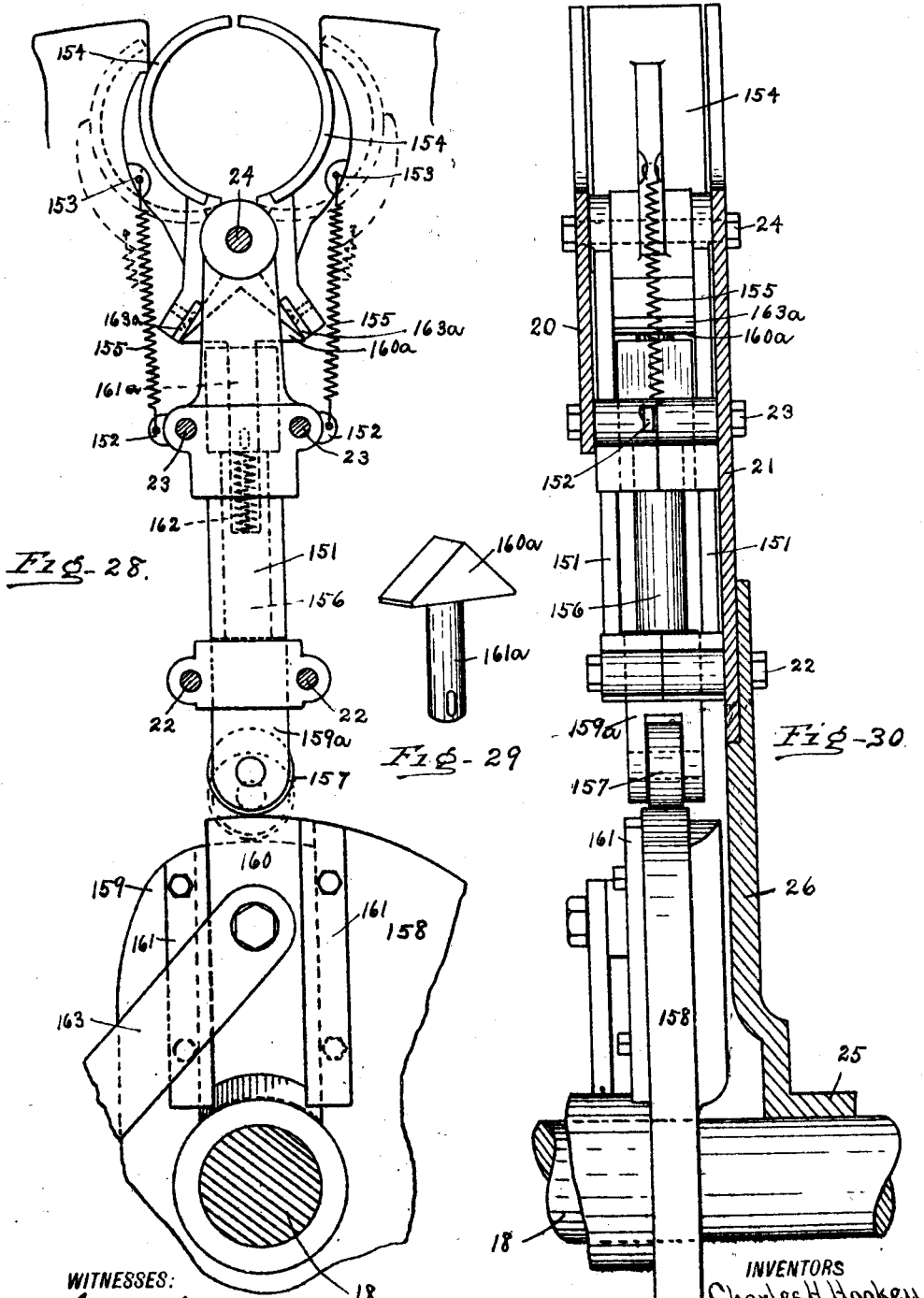

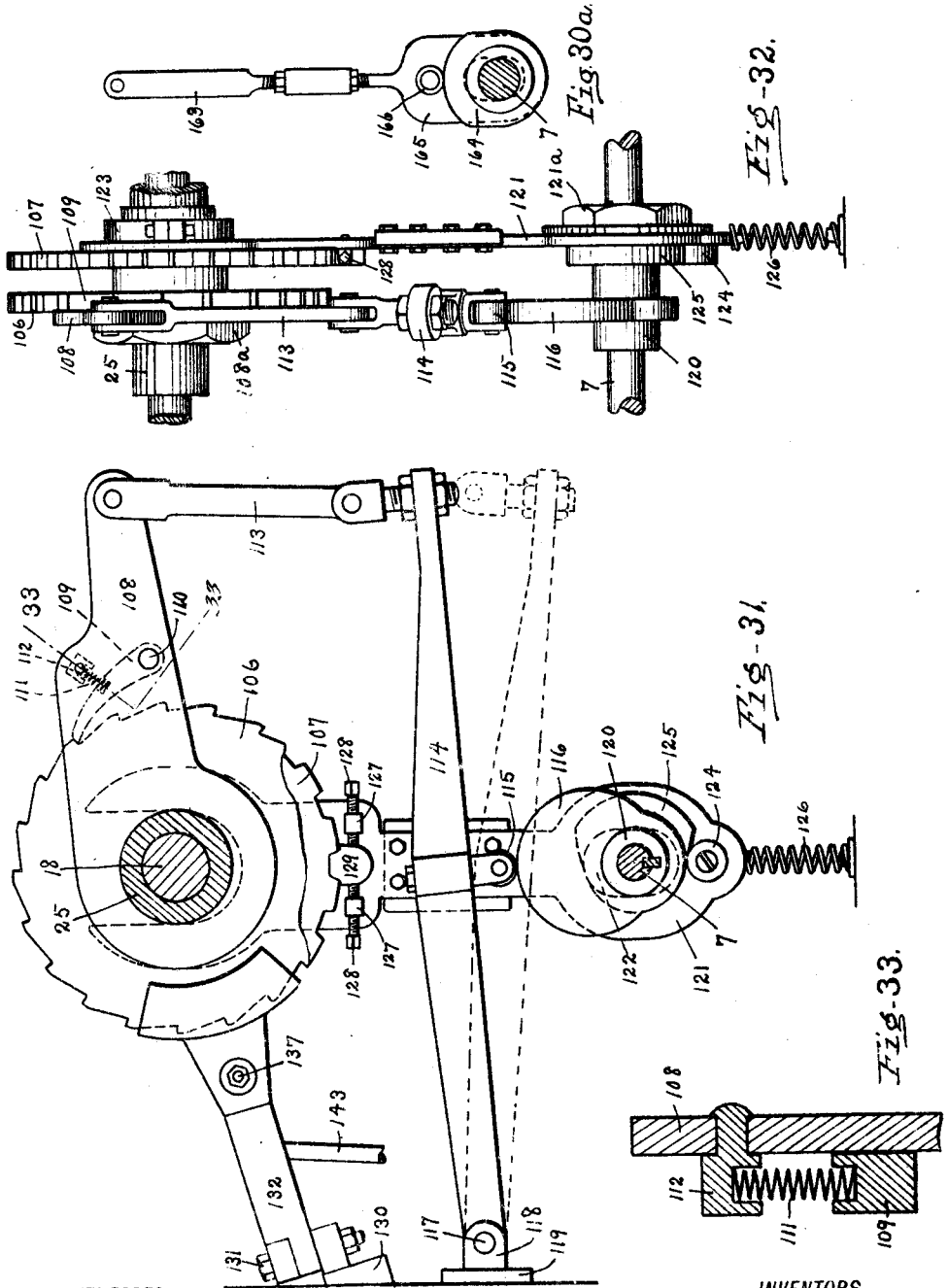

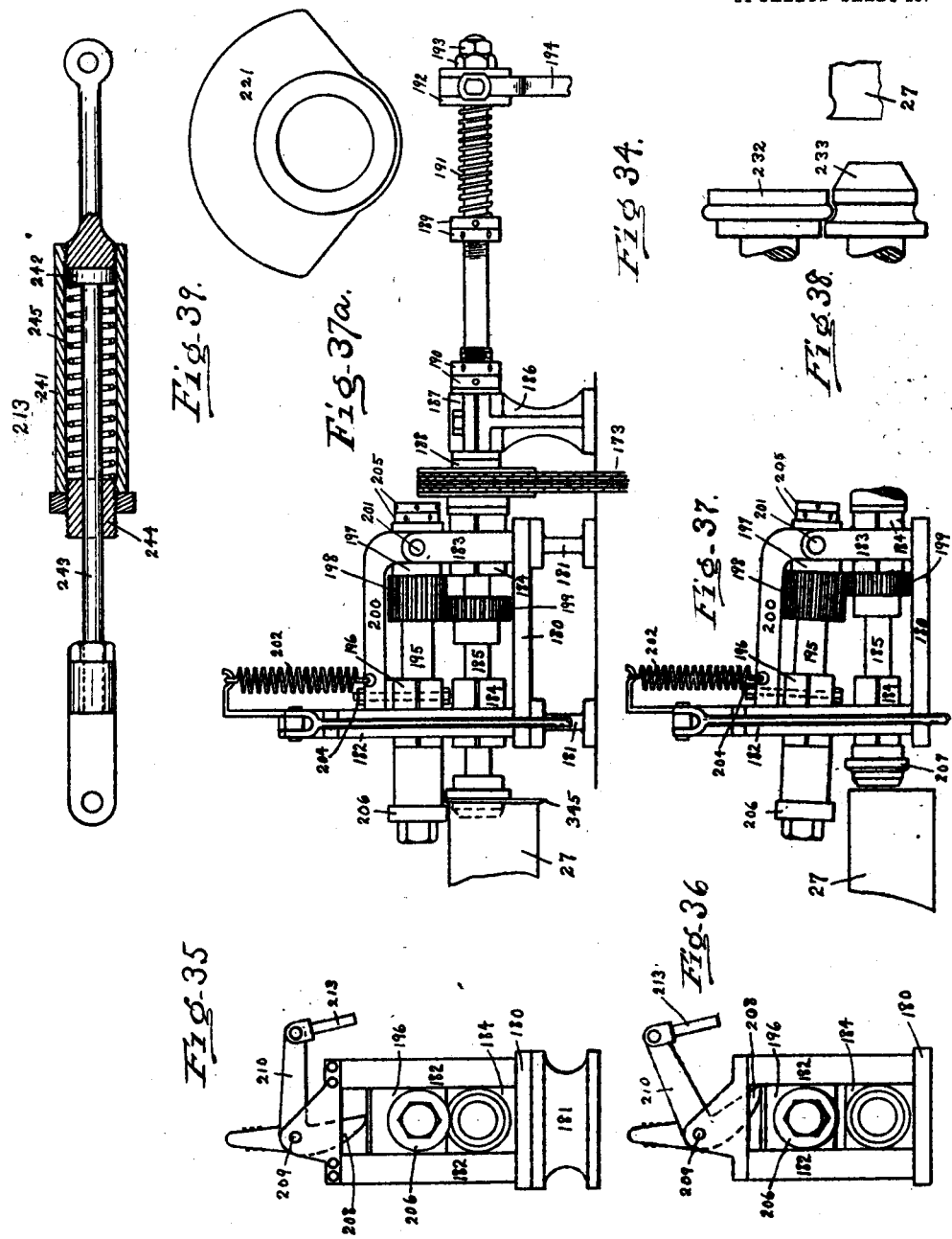

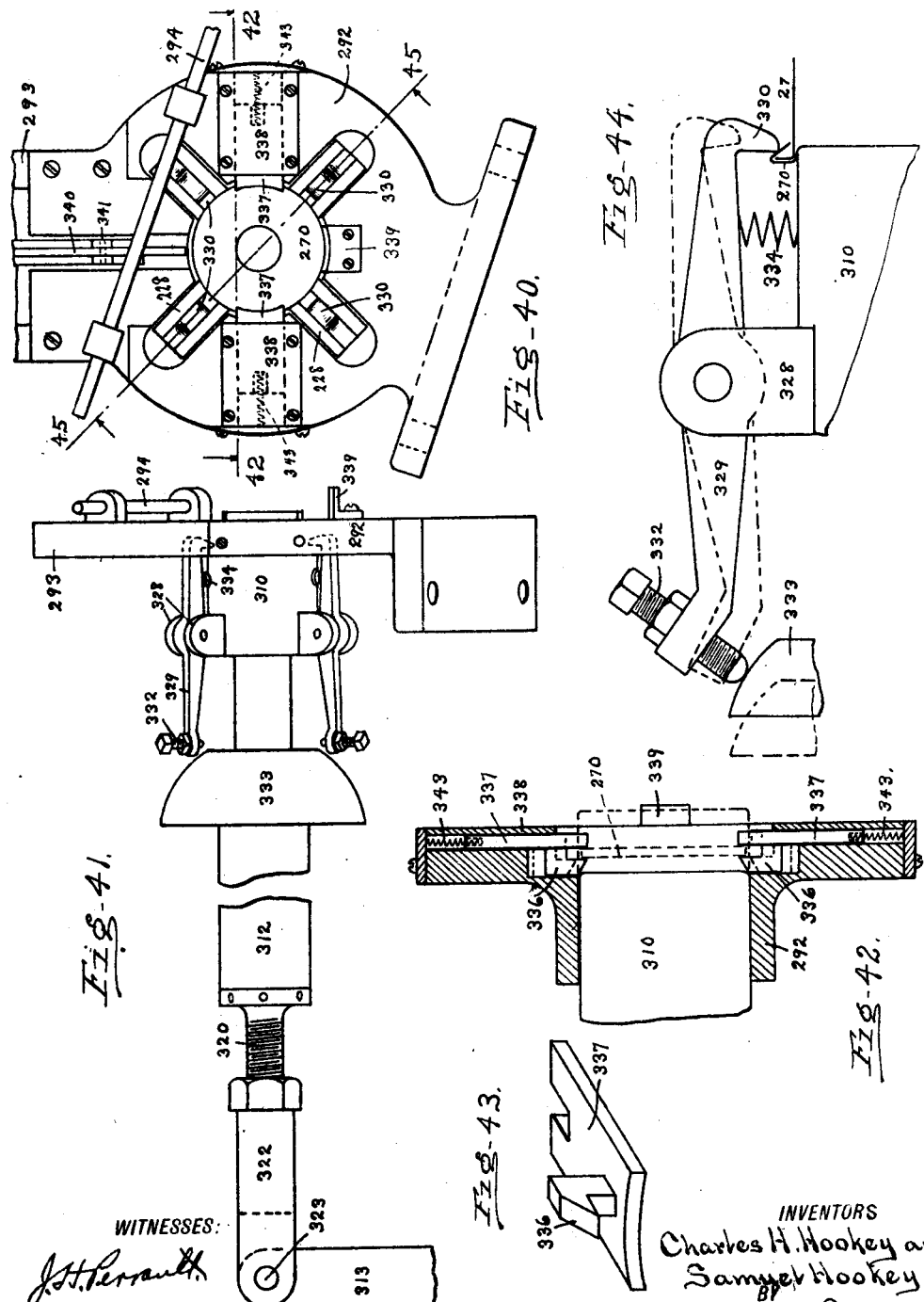

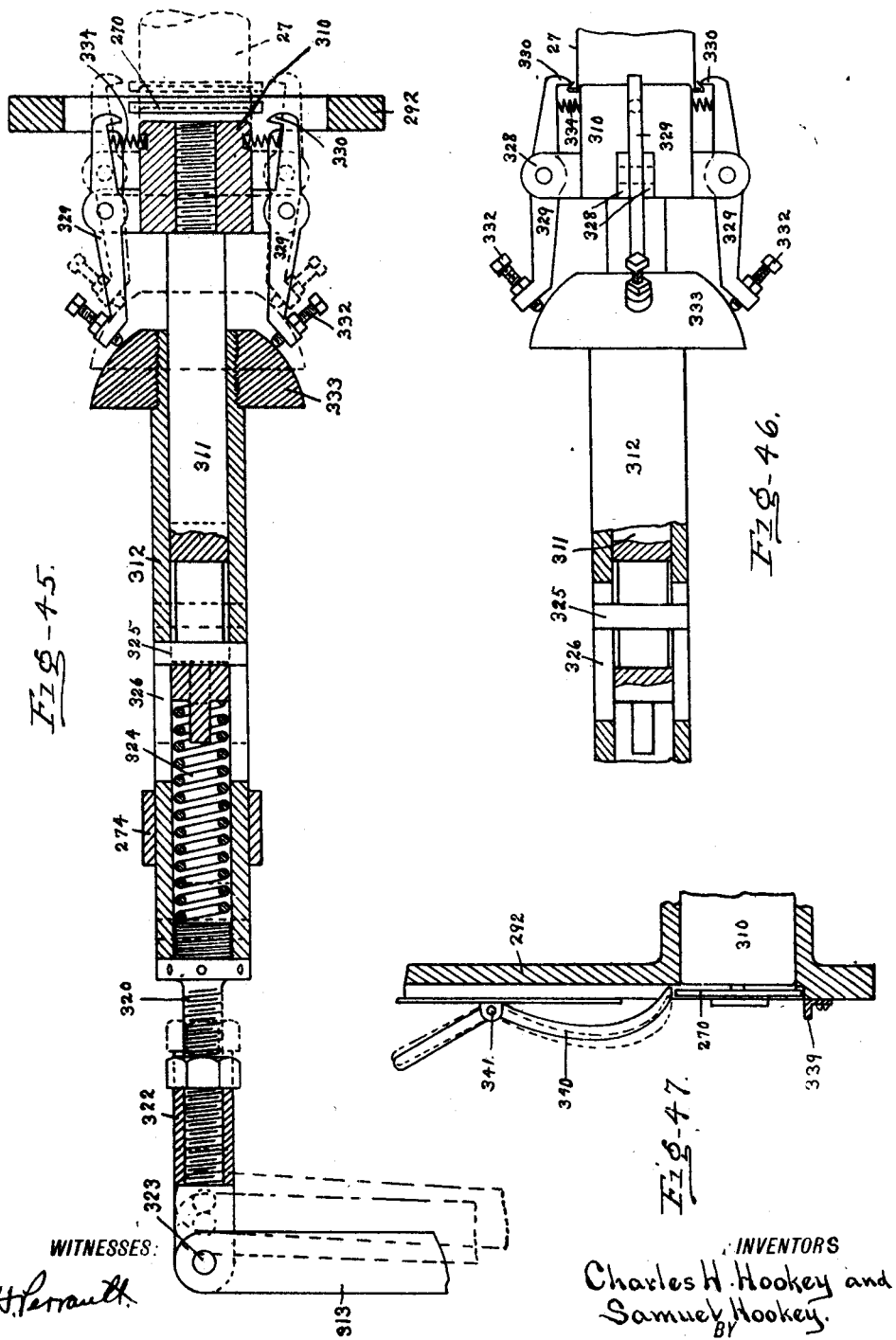

C. H. & S. HOOKEY.
CAN HEADING MACHINE.
APPLICATION FILED FEB. 21, 1913.
1,105,661.
Patented Aug. 4, 1914.
21 SHEETS—SHEET 18.
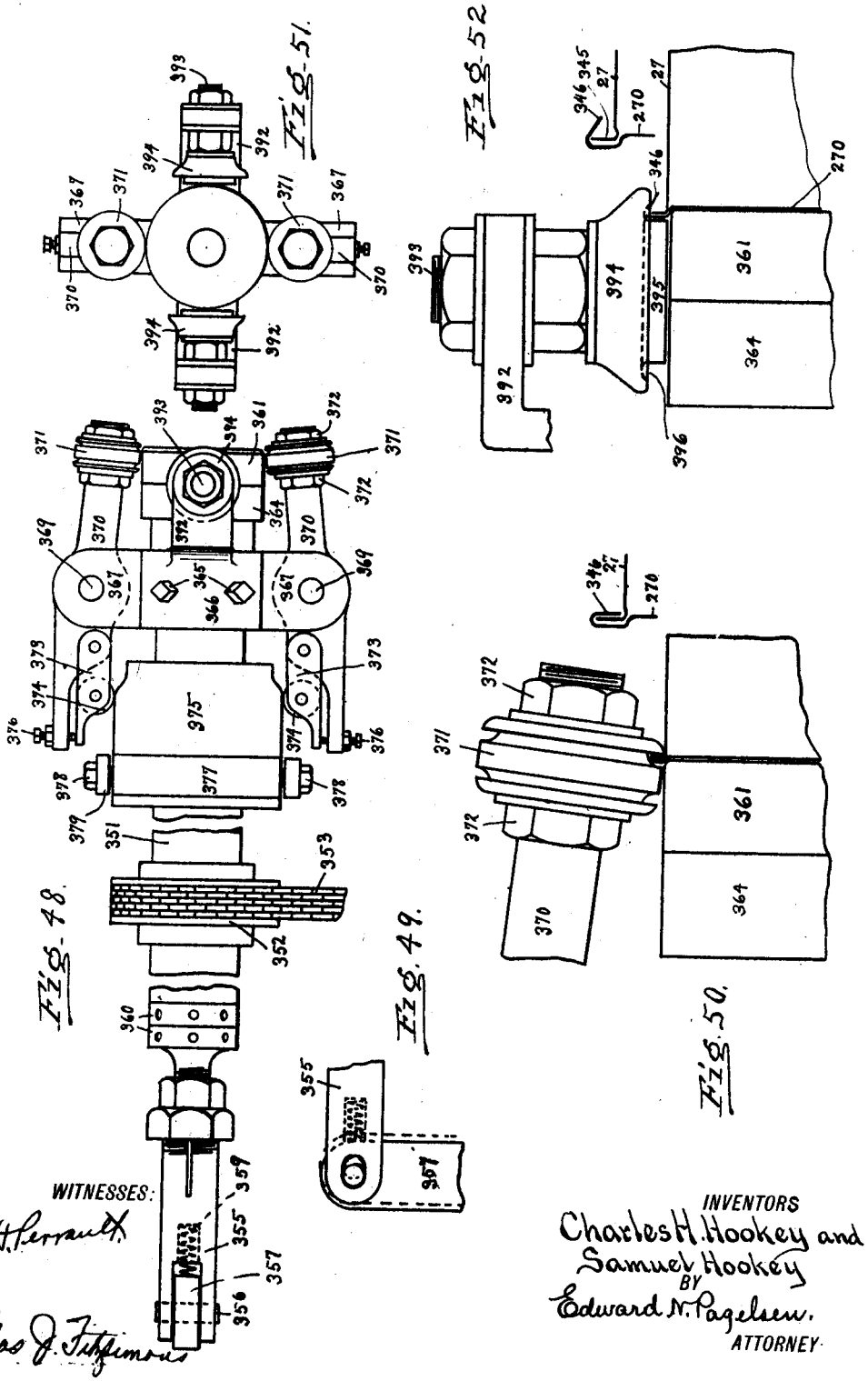
WITNESSES:
INVENTORS
Charles H. Hookey and
Samuel Hookey
BY
Edward N. Pagelsen.
ATTORNEY

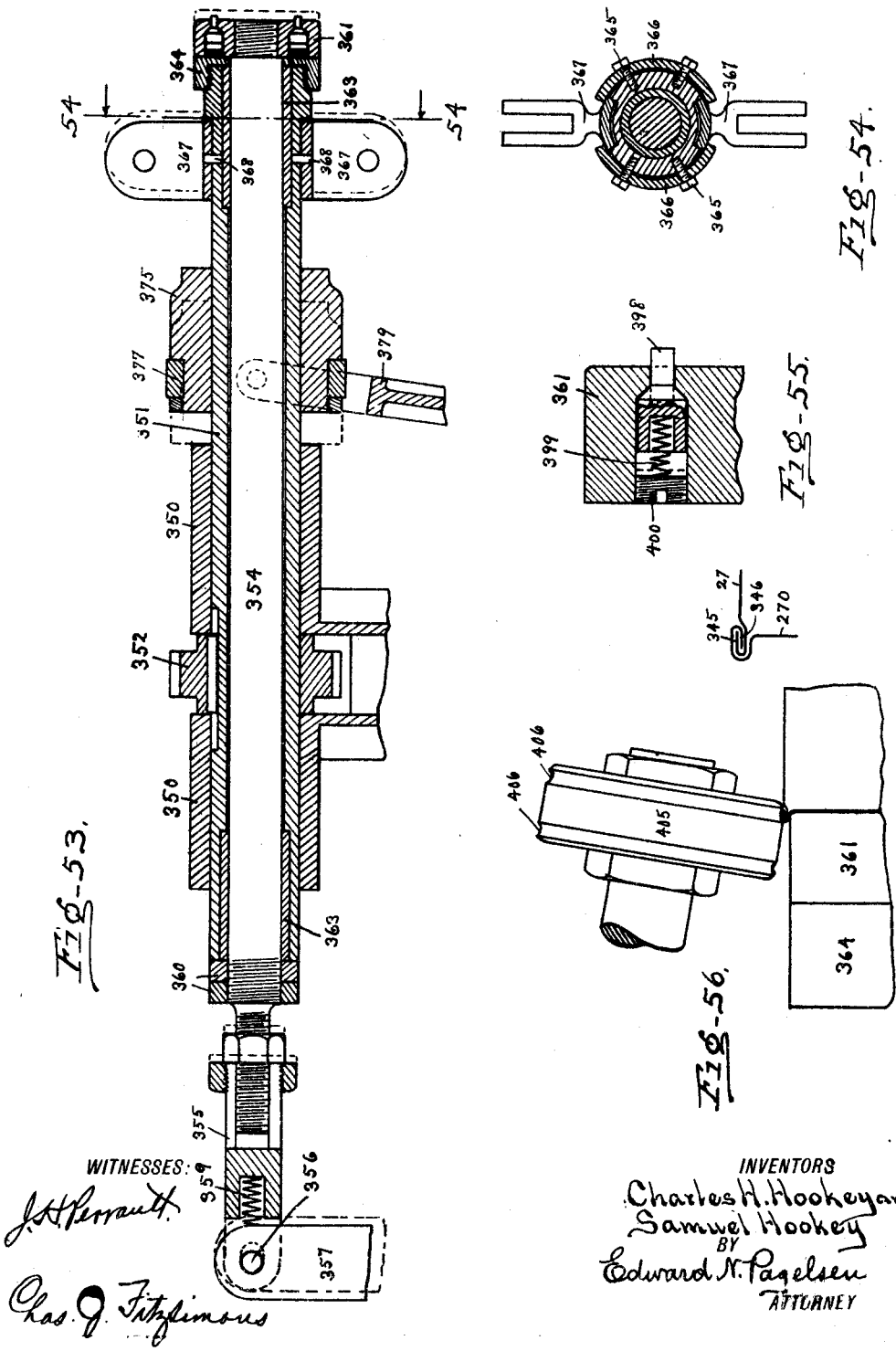

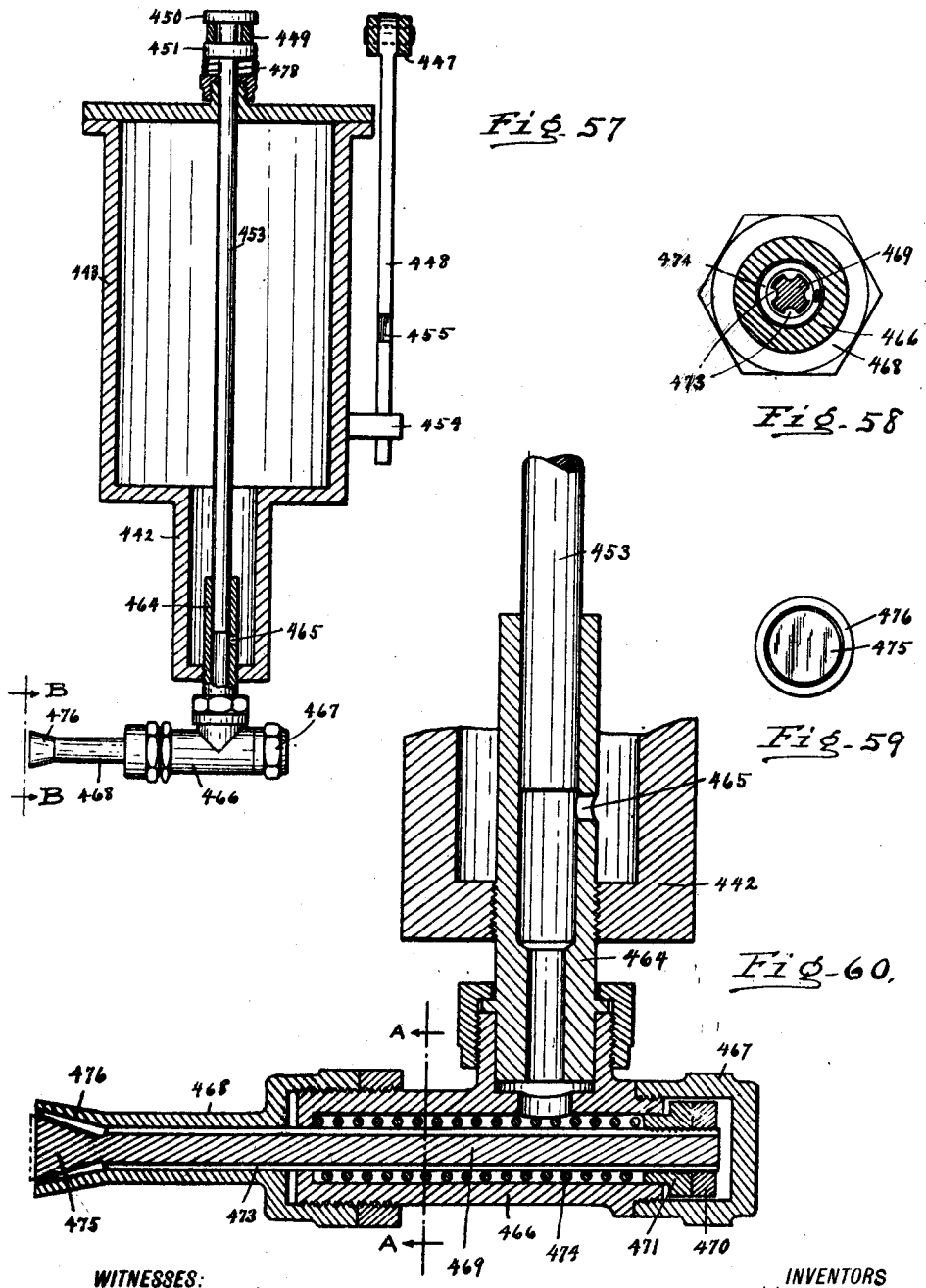

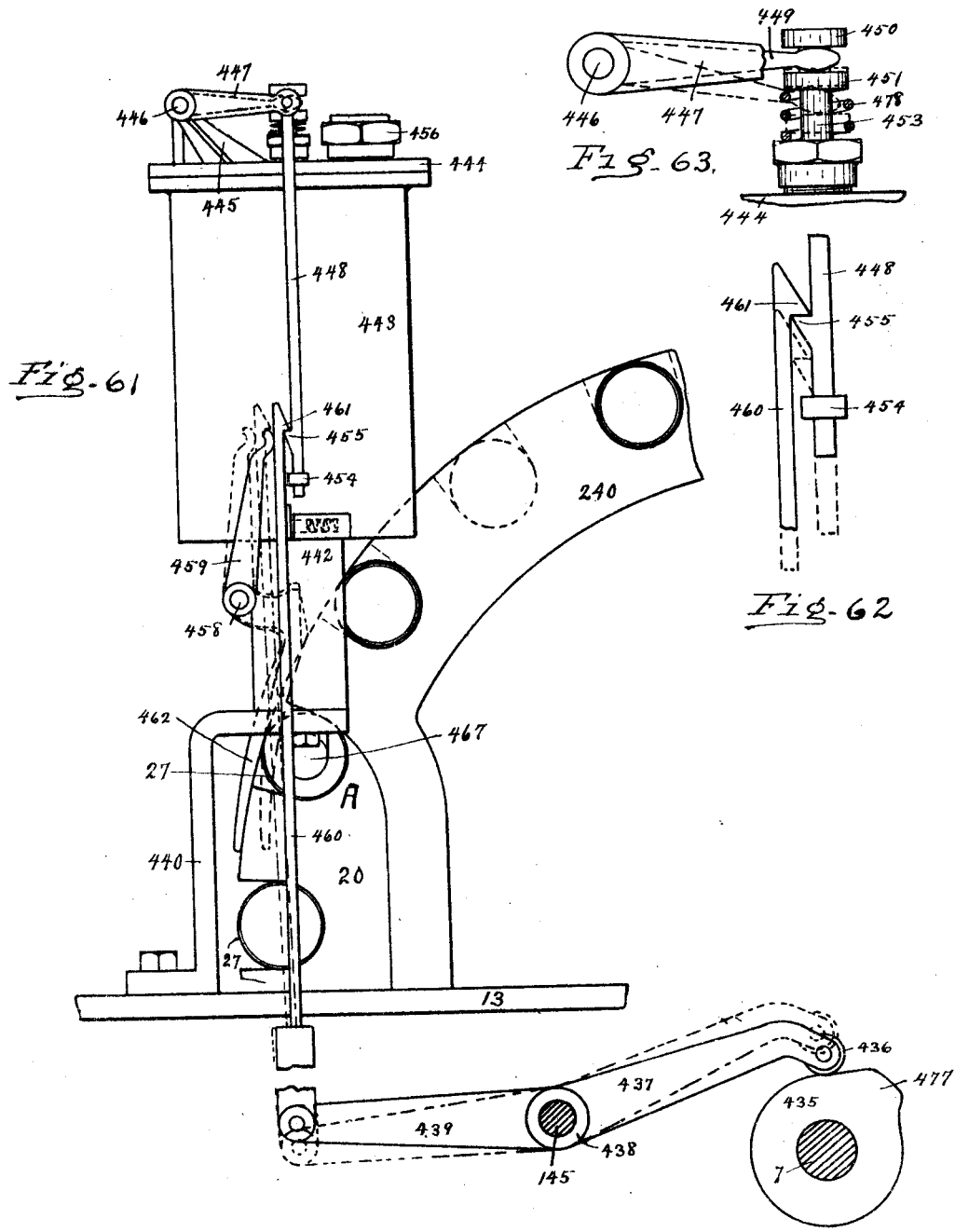

UNITED STATES PATENT OFFICE.

CHARLES H. HOOKEY AND SAMUEL HOOKEY, OF WYANDOTTE, MICHIGAN, ASSIGNORS TO PENNSYLVANIA SALT MANUFACTURING COMPANY, OF PHILADELPHIA, PENNSYLVANIA, A CORPORATION OF PENNSYLVANIA.

CAN-HEADING MACHINE.

1,105,661.   Specification of Letters Patent.   Patented Aug. 4, 1914.

Application filed February 21, 1913.   Serial No. 749,911.

*To all whom it may concern:*

Be it known that we, CHARLES H. HOOKEY and SAMUEL HOOKEY, citizens of the United States, residing at Wyandotte, in the county of Wayne and State of Michigan, have invented a new and Improved Can-Heading Machine, of which the following is a specification.

This invention relates to novel means for uniting the bodies and heads of sheet metal cans, and its object is to provide a can-heading machine which shall secure the heads to the body by means of a double seam, which shall form this seam in such a manner that there will be little possibility of leakage between the several thicknesses of metal, which shall be rapid in its operation, and which shall be so constructed that it will withstand the wear and tear of service without requiring repairs except at infrequent intervals.

This machine consists in combination with novel feeding mechanisms for the heads and bodies, of a revoluble carrier composed of two notched disks and jaws mounted between them adapted to hold the can bodies in proper notches in the disks, of an improved flanging device for one end of the can body and a heading device for the opposite end of the body in line with each other, of a head-attaching device for placing the heads on the ends of the bodies and bending portions of the flanges of the heads over the flanges of the bodies so that the heads will remain attached to the bodies while moving to the first seaming mechanism, of a novel seaming mechanism for turning the entire flange of the head around the flange formed on one end of the body, of a second novel seaming device for completing the rolling down together of the head and body flanges, and of novel operating mechanism for the different parts of the machine.

This invention further consists in novel details of construction of the different parts enumerated above, which parts are more particularly specified in the claims.

Figure 2:
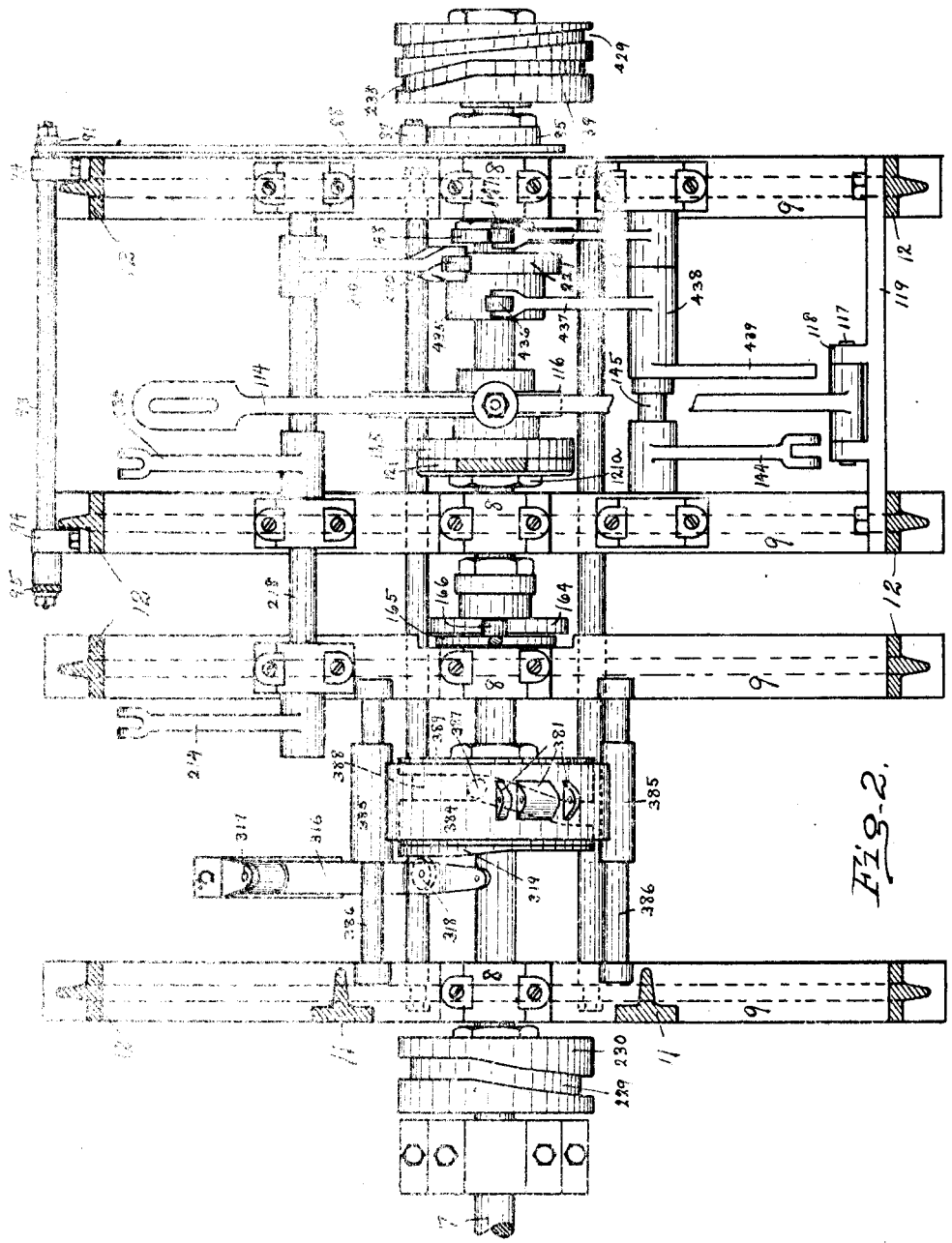
Figure 3:
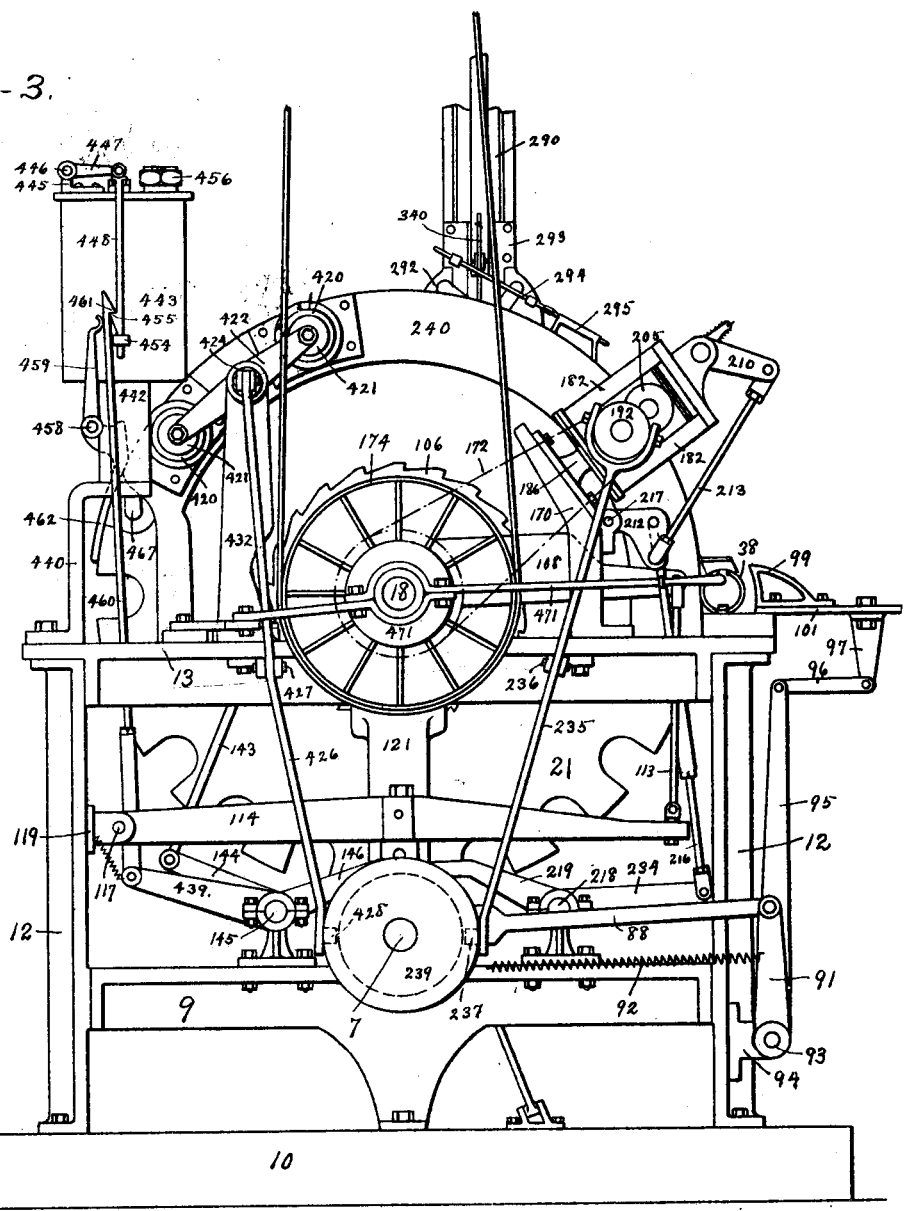
Figure 4:
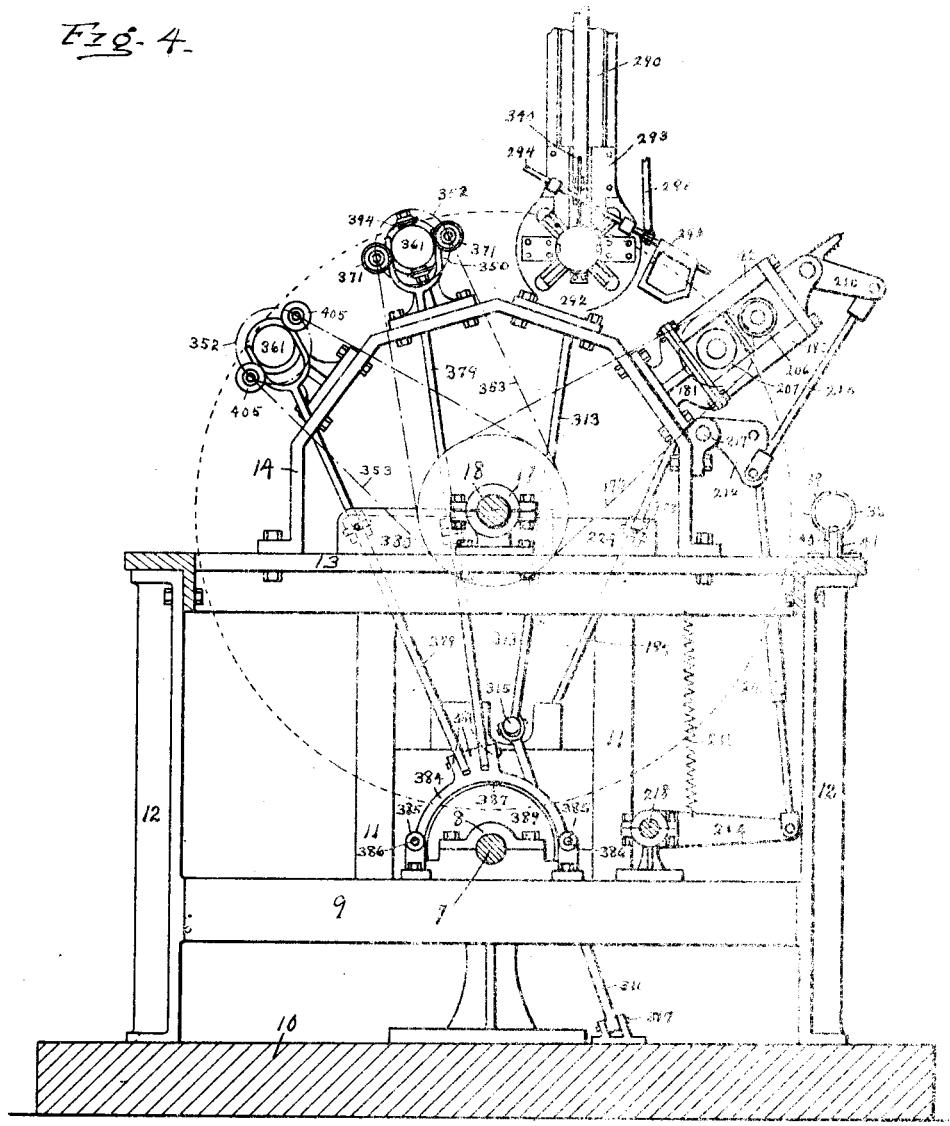
Figure 5:
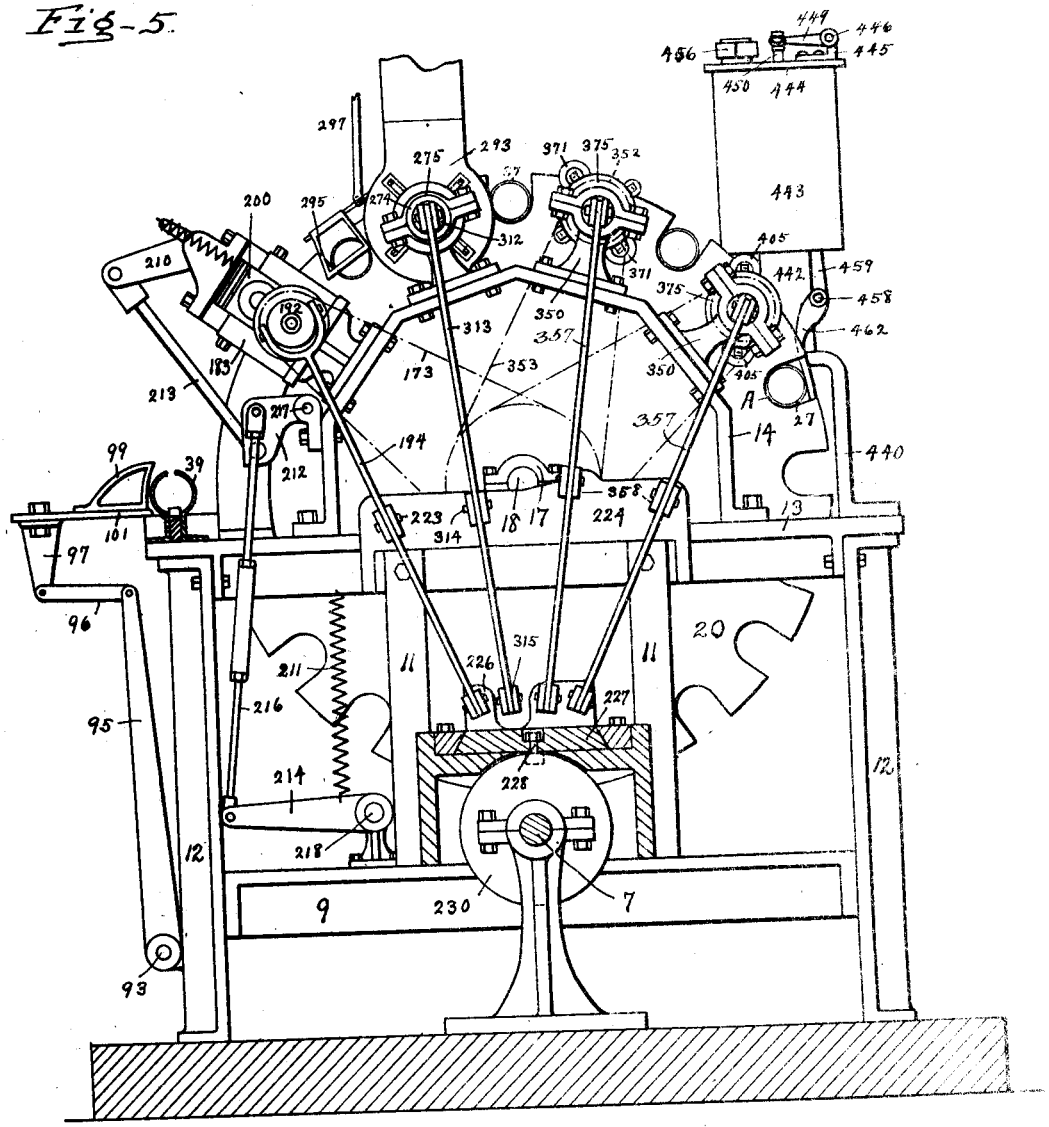
Figure 17:
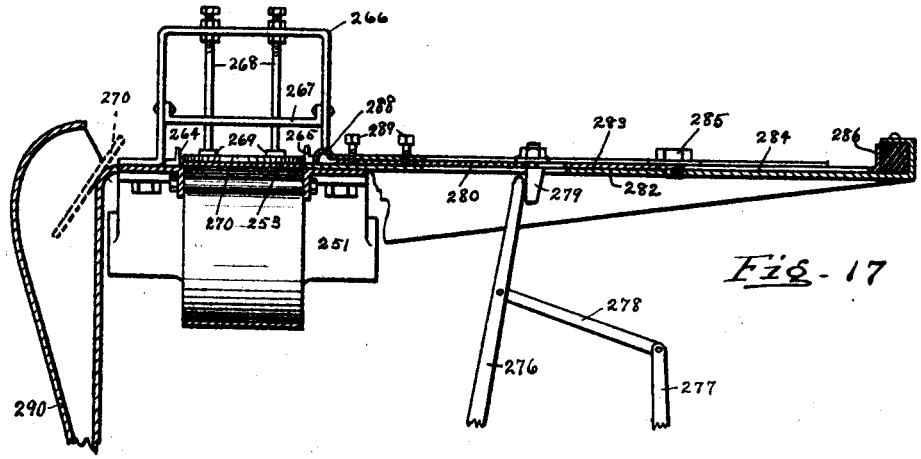
Figure 18:
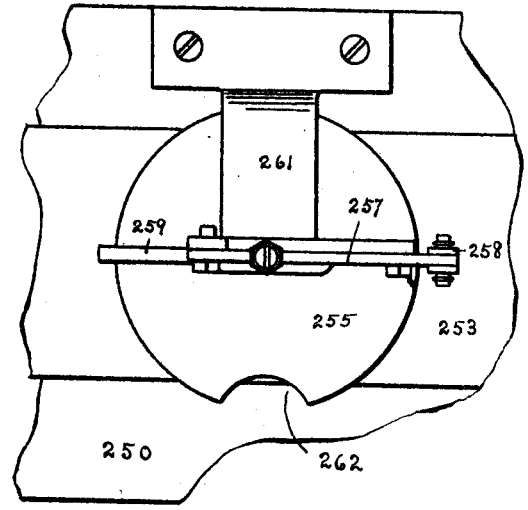
Figure 23:
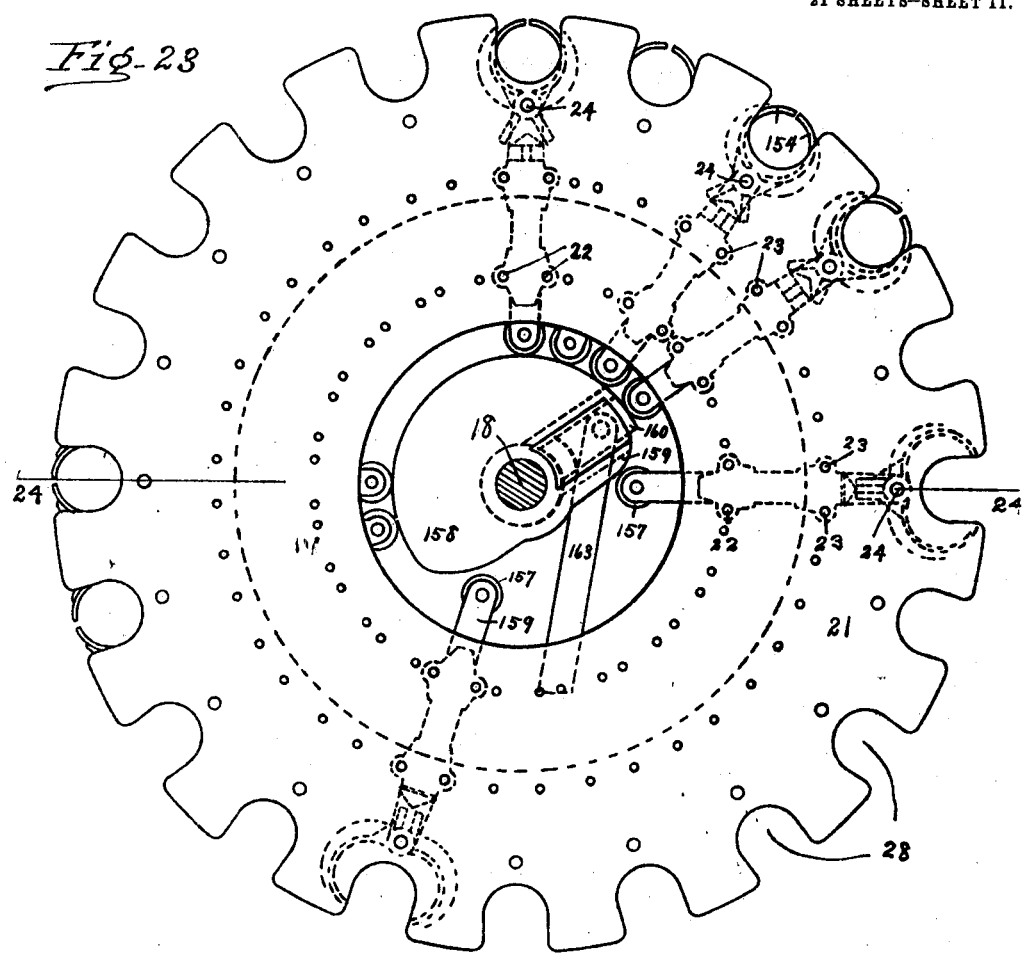
Figure 24:
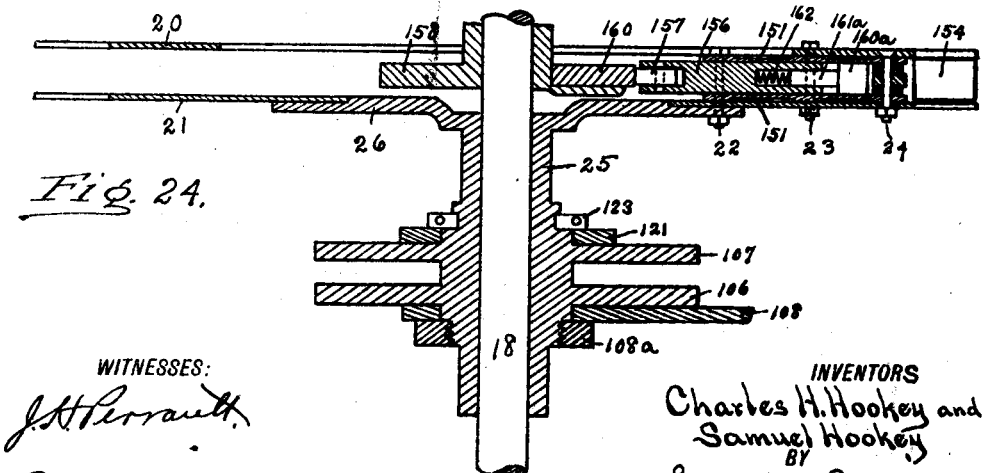

In the accompanying drawings Figure 1 is a plan of the improved machine with the head-feeding device omitted. Fig. 1ª is a detail of the can holder. Fig. 2 is a plan of the cam shaft and the supporting mechanism therefor, together with the cams on the cam shaft. Fig. 3 is an end elevation of the machine taken from the right in Fig. 1. Fig. 4 is a section on the line 4—4 of Fig. 1. Fig. 5 is a section on the line 5—5 of Fig. 1. Fig. 6 is a side elevation of the body conveyer. Fig. 6ª is an elevation of the feed pawl and its stop. Fig. 6ᵇ is an elevation of the actuating mechanism of the conveyer. Fig. 7 is a section on the line 7—7 of Fig. 6. Fig. 7ª is a plan of a stop pawl. Fig. 8 is an elevation of a feeding arm. Fig. 9 is another view of the same when in a different position with respect to its guide. Fig. 10 is a section on the line 10—10 of Fig. 6. Fig. 10ª is an elevation of the disconnector, Figs. 10 and 10ª being on a larger scale. Fig. 11 is a plan and Fig. 12 is an elevation of the can-head conveyer. Fig. 13 is a plan, Fig. 14 an end elevation and Fig. 15 a rear elevation of the can body feeding mechanism. Fig. 16 is a vertical section on the line 16—16 of Fig. 15. Fig. 17 is a section on the line 17—17 of Fig. 11. Fig. 18 is a plan and Fig. 19 an elevation of the device for stopping the heads when two are stuck together. Fig. 20 is a side elevation of the head feeder and guide. Fig. 21 is a section on the line 21—21 of Fig. 20. Fig. 22 is a detail of the plate which is adapted to swing into the path of the can bodies in order to determine whether can heads should be fed down. Fig. 23 is an elevation of the can body carrier. Fig. 24 is a horizontal section of the can body carrier and the driving disks therefor on the line 24—24 of Fig. 23. Fig. 25 is a plan of the checking device for the can body carrier. Fig. 25ª is an elevation of the cam for actuating this checking device. Fig. 26 is an elevation of the checking device. Fig. 27 is a plan of the locking device for the same. Fig. 28 is a front elevation of the grippers which hold the can bodies in position in the can body carrier. Fig. 29 is a view of the actuating cam for the grippers. Fig. 30 is side elevation of these grippers. Fig. 30ª is a detail of the device for closing the jaws of the can carrier. Fig. 31 is a front elevation and Fig. 32 a side elevation of the feeding and locking devices for the can body carriers. Fig. 33 is a section on the line 33—33 of Fig. 31. Fig. 34 is a side elevation of the mechanism for preparing the can bodies to receive the heads by beading and flanging one end of said bodies. Fig. 35 is an end elevation of this mechanism. Fig. 36 is a similar elevation with the grooving rollers separated. Fig. 37 is a side elevation of the same. Fig. 37ᵃ is an elevation of the cam for actuating this mechanism. Fig. 38 is a view showing the beading rollers for the opposite ends of the can bodies. Fig. 39 is a view partly in longitudinal section of a connecting link for actuating this mechanism. Fig. 40 is an end elevation and Fig. 41 a side elevation of the mechanism for pinching down portions of the flanges on the heads over the edges of the flanges on the bodies. Fig. 42 is a section on the line 42—42 of Fig. 40. Fig. 43 is a perspective view of the guide for the can heads. Fig. 44 is an enlarged detail of the benders. Fig. 45 is a longitudinal section of the spindle and the collars on the end of the same on the line 45—45 of Fig. 40. Fig. 46 is an elevation of the operative end of this spindle. Fig. 47 is a detail of the mechanism for keeping the head from jumping out of position after being placed. Fig. 48 is a plan of the main spindle of the first seaming mechanism which completes the bending of the flange on the head around the flange on the body. Fig. 49 is an elevation of the rear end of the same. Fig. 50 is an enlarged detail of the seaming roller. Fig. 51 is an end view of the mechanism shown in Fig. 48. Fig. 52 is a detail on a larger scale of the straightening mechanism for the flanges. Fig. 53 is a longitudinal section of this main spindle. Fig. 54 is a section on the line 54—54 of Fig. 53. Fig. 55 is an enlarged detail of the right end of Fig. 53. Fig. 56 is a view on a larger scale showing the action of the second seaming rollers. Fig. 57 is a vertical section of the mechanism for injecting the sealing material into the can after the heading is completed. Fig. 58 is a section on the line A—A of Fig. 60. Fig. 59 is an end elevation of the nozzle of this sealing device. Fig. 60 is a section similar to Fig. 57 but on a larger scale. Fig. 61 is an elevation taken from the right in Fig. 1 of this sealing mechanism. Fig. 62 is a detail on a larger scale of the actuating mechanism of the same. Fig. 63 is another detail on a larger scale showing the operating mechanism for the plunger. Fig. 64 is a detail of the means for holding one of the controlling cams.

Similar reference characters refer to like parts throughout the several views.

The can bodies to which caps are affixed by means of this machine are formed of rectangular metal sheets whose edges are joined to form short cylinders by special machines for this purpose. The conveyer shown at the rear of the machine in Fig. 1 receives these can-bodies and carries them to the right, to the feeding device which places them in proper position in the can carrier. At the same time, the can heads are formed on another machine and are fed to this machine by a can-head conveyer which is mounted above the machine shown in Fig. 1, and which permits them to fall to the proper head-attaching means at proper intervals of time.

All the body conveying mechanism which is shown in the accompanying drawings is driven by a counter-shaft 1 mounted in bearings 2, which shaft is preferably driven by a chain 3 or other flexible connector, which drives a sprocket 4 secured to the shaft 1. The mechanism for operating the can-body conveyer connects to the end of this shaft 1 and will be described later on. Secured to the shaft 1 is a miter gear 5 which meshes with a similar gear 6 on the cam-shaft 7, which shaft is shown on a larger scale in Fig. 2. This shaft is mounted in bearings 8 on the cross beams 9 of the main frame of the machine. Extending upwardly from the bed plate 10 are the legs 11 and 12, also shown in Figs. 3, 4 and 5, which legs support the table 13 and the arched plate 14, which supports the flanging and seaming mechanisms. Mounted on the table 13 in bearings 17 is the main shaft 18 on which are secured the sprockets which drive the flanging and seaming mechanisms.

Near the middle of the main shaft is loosely mounted the can-body carrier which consists of two rings 20 and 21, connected by means of bolts 22, 23 and 24. A sleeve 25 is mounted in bearings 37 concentric with the main shaft 18 and carries a disk 26 to which the ring 21 may be secured by means of the bolts 22, as shown in Fig. 24. These rings 20 and 21, which comprise the body carrier, are formed with notches or pockets 28 into which the bodies are forced by means of the body feeder which takes them from the body conveyer, which will now be described. It should be remembered that the counter-shaft 1 and the cam-shaft 7 each make one revolution for each body that is headed, but that the main shaft 18 may make any desired number of revolutions, preferably five or six.

*The can body conveyer.*—A disk 30 on the rear end of the shaft 1 has a cam-groove 31, (Fig. 6) in which a pin 32 carried by the lever 33, rides. A collar 34 on the end of this shaft holds the lever against the cam, and a slot 35 in the lever permits the shaft to pass through. A pivot 36 for the lever may be fastened to the plate 10. The can-bodies 27 are delivered in any desirable manner to the end of the conveyer, which consists of two side plates 38 and 39, so curved that when united they form a tubular passage, and having downward extensions 40 and 41 which rest on the table 13. Between the extensions 40 and 41 are two parallel plates 42 and 43, which are secured against the sides of a block 44, which has a downwardly extending arm 46, the block and arm being slidable in a slot in the table. The upper edges of the plates 42 and 43 are held properly spaced by means of small blocks 47, as indicated in Fig. 6. The arm 46 carries a pin 48 to which is connected a long rod 49 having a flat, longitudinally slotted bar 50 on its free end, which is provided with a transverse notch 51 adapted to receive the pin 52 on the lever 33 which is slidable in the slot of this bar 50. When the shaft 1 revolves and the pin 52 is in the notch 51, the plates 42 and 43 will move back and forth within the conveyer. To disengage the conveying mechanism from the driving shaft 1, the bar 50 is lifted so that the pin 52 will be out of the notch 51. To do this, a small handle 54 is mounted on the pin 55 carried by the lever 33, which handle has a second pin 56 which engages in a slot 57 in the bar-lifter 58. See Fig. 10ª. This lifter has a slot 59 through which the pin 55 extends, and a second slot 60 through which the pin 61, also mounted in the lever 33, extends. So long as the parts are in the position shown in Fig. 6ᵇ, the reciprocation of the lever 33 will move the plates 42 and 43 back and forth, but when the handle 54 is swung up, the lifter 58 will be raised sufficiently to carry the bar 50 up high enough to disengage the pin 52 from the slot 51, whereupon the lifter 58 will slide back and forth underneath the bar 50.

Mounted between the plates 42 and 43 on the pins 63 are the pawls or dogs 54 (Fig. 6ª) which are normally held in the position shown in Fig. 6 by means of the small springs 65. These dogs or pawls extend up into the cylindrical portion of the conveyer so that they will push the can bodies forward, their upward movement being limited by the blocks 47. On the return stroke, the springs will permit the forward ends of these pawls to be depressed by the can bodies as the pawls pass under them, so that the can bodies will not be pulled backward. Mounted on the plate 39 by having one end rigidly secured thereto by means of the screws 67, are wire springs 68 having portions 69 extending through slots in said plate 39, as shown in Fig. 7ª. These springs prevent the can bodies from moving backward but do not prevent them from moving forward.

The cans will be introduced into the end of the conveyer by any desired mechanism. In order to start them moving forward, the device shown in Figs. 6, 8, 9 and 10 may be employed. Between the plates 42 and 43, and mounted on the pivot 71 is an actuating member having a rearwardly extending arm 72 provided with a hook 73 at its outer end. The inner arm 74 is provided with a pin 75. The extension 40 has a slot 76 into which the guide-rib 77 on the latch 78 extends, which latch is pivoted on the pin 79 carried by the extension 40, as shown in Fig. 6. When the plates 42 and 43 move forward, a pin 75 will move below the guide-rib 77. The pin 75 will pass the forward inclined end of the guide-rib 77 when the lever 33 has moved forward its full distance whereupon the guide 77 will fall to the plate 13 with the left end (Fig. 6) below the level of the pin 75. On the return stroke of the lever, the pin 75 will ride up on this forward end of the rib 77 and be elevated, which will cause the hook 73 to lower down out of the path of the can bodies. This pin 75 will ride on this guide-rib until just before the rear end of its stroke, when it will fall and cause the hook 73 to engage back of the next can body. The upper edges of the plates 38 and 39 are separated sufficiently to permit a can body to be removed from the conveyer after it has been squeezed down flat by the operator. This is sometimes necessary when the mechanism becomes disarranged. The front side of the conveyer may have a portion 80 at its rear end, as shown in Fig. 1, mounted on hinges 81, as indicated in Fig. 6, and held in place by means of a latch 82.

*The can body feeder.*—As stated before, the shaft 7 makes one complete revolution for each body which is operated upon by the heading mechanism. The bodies are moved along until they are opposite the can body carrier by means of the body conveyer. When they are opposite the body carrier, the mechanism shown in Figs. 13 to 16 inclusive, feeds these bodies into the pockets of the body carrier. Secured on the right end of the shaft 7, as shown in Fig. 2, is a cam 85 having a low portion 86, which cam engages the roller 87 on the link 88. This link 88 is between this cam and one of the bearings 8 of the shaft 7, and is provided with a slot 89 through which the shaft may pass. The outer end of this link engages a pin 90 in the crank arm 91, between which crank arm and the cross beam 9 is a spring 92 which holds the roller 87 against the cam 85. The crank 91 is mounted on the shaft 93 carried in bearings 94 mounted on the frame, which shaft also carries the long crank-arm 95, which connects to the link 96. At each revolution of the shaft 7, therefore, the link 96 will move backward and forward, and as this link is connected to the post 97 extending downwardly from the slidable plate 98, the body engaging end 99 of this plate will move from the position shown in solid lines in Fig. 14 to that shown in dotted lines, and back, once for every revolution of the shaft 1. The plate 98 slides on a bracket 101 carried by the table 13 of the machine, and a screw 102 screws into this plate 101 and through the slot 103 in the plate 98, while the post 97 slides in a slot 104 in the bracket 101. By reason of these two slots 103 and 104 and of the screw 102 and the post 97, the body feeder will operate properly at all times at right angles to the shafts 7 and 18. During the time that the body feeder is operating, that is, during the time the roller 87 is passing the low portion 86 of the cam 85, the body carrier is stationary. In the drawings the body carrier is shown to have twenty pockets, but any other desired number may be employed. A mechanism is provided to actuate the body carrier one step between succeeding actuations of the body feeder, which mechanism, together with the devices for holding the body carrier in position after actuation, and the mechanism for holding the can bodies in position in the body carrier, will now be described.

*The can body carrier.*—As stated before, the body carrier is formed of two rings 20 and 21 mounted on a flange or disk 26 on one end of the sleeve 25, as shown in Fig. 24. Two other disks 106 and 107 are also connected to this sleeve 25 and are notched as shown in Fig. 31. Mounted on the sleeve 25 next to the disk 106 is an arm 108 which carries a pawl 109 mounted on the pin 110. A nut 108ª holds the arm in position. A spring 111 between this pawl and the block 112 on the arm 108, is adapted to hold this pawl against the disk 106. On each upward stroke of this arm 108, the disk 106 and the body carrier will be turned one step. A link 113 connects the outer end of this arm 108 to the lever 114, which lever carries a roller 115 that rides on the cam 116, secured to the shaft 7. This lever 114 may be pivoted on the shaft 117, mounted in lugs 118 on the bar 119, as shown in Fig. 2.

After each actuation of the disk 106, the carrier must be locked to prevent displacement of the can bodies and can heads during the operation of the machine upon them. This is accomplished by the following mechanism. A flat plate 121 is provided with a slot 122 to receive a sleeve 120 which forms the hub of the cam 116 and extends to the left in Fig. 2. This plate is forked at its upper end and receives the sleeve 25, said sleeve having a split collar 123, as shown in Fig. 24, to hold this plate in vertical position. A roller 124 is mounted on the lower end of this plate 121 and engages the cam 125 on the shaft 7. A spring 126 normally forces the plate 121 upward. A nut 121ª holds the plate 121 in position. Two projections or lugs 127 on the plate 121 receive the screws 128, between which screws the tooth 129 is adjustably mounted. Fig. 31 shows that the lever 114 has just reached the upper end of its movement, and that while it is held in this position, the high portion of the cam 125 has passed the roller 124 and is permitting the spring 126 to force the tooth 129 up into a notch in the disk 107, and thereby lock the sleeve 25 and the can carrier in proper position.

In order to check the momentum of the can body carrier during its movement, a clamp has been provided and is illustrated in Figs. 25, 26, 27 and 31. A bracket 130 is mounted at an angle on the frame as shown in Fig. 31, and carries a pin 131 on which the two arms 132 and 133 are mounted. These arms are normally held apart by a spring 134, shown in Fig. 25, and the arms are provided with gripping faces 135 so they can engage the notched disk 106. A bolt 137 extends through both of these arms, and the arm 133 has a cam-face 138 complementary to the cam 139 on the arm 140, also mounted on the bolt 137. A nut 141 and a washer underneath the same limit the outward movement of the cam 139, while a link 143 connects to the outer end of this arm 140, and to a lever 144 secured to the shaft 145, as shown in Fig 3, and on the opposite end of this shaft is an arm 146 which carries a roller 147 that engages the cam 148 on the cam-shaft 7 (Fig. 3). At each revolution of the cam-shaft, this arm 140 will swing up and down, the downward movement causing the gripping face 135 to engage the disk 106, and this will occur just as the lever 114 begins its movement, and the release occurs just after the movement of the lever is completed, so that the carrier can be freely revolved by hand and the tooth 129 will properly position the carrier.

Referring to Fig. 23, it will be noticed that the bodies are fed in from the right on the line 24—24, and that the carrier turns to the left. Immediately after the bodies enter the notches, and the carrier begins to turn, the jaws partly close in the following manner. See Figs. 28 to 30. The bolts 22 extend through the lower ends of the two halves of each guide 151, securing it to the disk 26 and ring 21. The intermediate portions of the halves of the guide are held between the rings 20 and 21 by means of the bolts 23, while the upper portions of the guide are held in position by the bolt 24. On each of the halves of the guide 151 is a lug 152 between which and the hole 153 in the jaws 154 the springs 155 extend, which jaws 154 are mounted on the bolt 24 between the upper ends of the parts of the guide 151. The normal position of these jaws 154 under the tension of the springs 155 is as shown in dotted lines in Fig. 28. Slidable radially of the shaft 18 in each of these guides, is a plunger 156 whose bifurcated inner end carries a roller 157 adapted to engage the cam 158, as shown in Fig. 23. The lower end 159ª of this plunger is squared to keep it from turning in the guide, so that the roller 157 will always be at the proper angle to the cam 158. In the upper enlarged squared end of this plunger is mounted a double-faced cam 160ᵃ having a stem 161ᵃ which rests on the upper end of the stiff spring 162, seated in a proper hole in the plunger. Moving the plunger 156 outward forces the double cam 160ᵃ between the inner ends 163ᵃ of the jaws 154, and thereby causes the jaws to approach each other as shown in solid lines in Fig. 28, the spring 162 permitting the jaws to adjust themselves to can bodies of slightly varying diameters.

The cam 158 is loose on the shaft 18 and held from turning by a cap 37 as shown in Fig. 64, so that when the body carrier revolves, the jaws will be kept closed during about one-half of a revolution of the can carrier, that is, so long as the rollers 157 engage the circular portion of the cam. Immediately after a body is fed into a notch 28 in the carrier, and the roller 157 of the plunger 156 engages the shoulder 159 of the cam, the jaws 154 will be partially closed. While in such position, the body is operated upon by the flanging and beading mechanisms. In order to firmly grip the can after the flanging and beading are completed, a small sliding block 160 is mounted in guides 161 on this cam 158 and may be forced outward by means of the link 163 actuated by the cam 164 at each revolution of the cam-shaft (Fig. 30ᵃ), and this occurs during the time that the body carrier is standing still and just after the flanging operation has been performed upon the can body. When the link 163 is forced upward, the plate 160 is forced out radially and the jaws 154 in line therewith are forced to firmly grip the can body. During about one-half of a revolution of the body carrier, the can bodies will be tightly gripped and held in the pockets in the rings 20 and 21.

As shown in Fig. 30ᵃ, the plate 165 at the lower end of the link 163 has a roller 166 in contact with the cam 164. See also Fig. 2. Referring to Figs. 1, 3, 4 and 5, it will be noticed that the upright bracket 170 on the right end of the machine and the arch-plate 14 located about the middle of the machine, support the flanging and beading devices which are substantially duplicates of each other, one on each side of the body carrier. The main shaft 18 is provided with sprockets 171 for the chains 172 and 173, which are constructed to revolve the flanging and beading mechanisms. This shaft 18 is revolved in any desired manner, preferably by a belt running on the pulley 174.

*Flanging and beading mechanisms.*—The details of construction of the flanging and beading mechanism are illustrated by Figs. 34 to 39 inclusive, and as these are duplicates of each other, only one is shown, and this is detailed as if seen from the rear side of the machine, and upright instead of at an angle to a vertical line, for the sake of clearness. The can bodies are flanged at one end in order to receive the heads, which operation is performed by the mechanism on the left of the body carrier (Fig. 1). The opposite end of the body is beaded to receive a cover after the can has been filled. The flanging mechanism is mounted on the arch-plate 14 and comprises (Figs. 34 to 38) two small pedestals 181 which carry the frame consisting of a base-plate 180, two tall frame posts 182 and two shorter frame posts 183. Bearings 184 for the shaft 185 are mounted between these posts, which shaft 185 is both revoluble and slidable in these bearings. A third pedestal 186 is mounted on the arched plate 14 and carries a bearing 187 for the shaft 185. Between the bearing 187 and the adjacent bearing 184 the driving wheel 188 is mounted, which wheel has any desired sliding connection with the shaft 185. The collars 190 limit the movement of the shaft. Adjustable collars 189 on the shaft 185 are engaged by the spring 191, against which the slidable collar 192 also bears. Nuts 193 on the end of the shaft prevent the collar 192 from slipping off. By means of the lever 194, also shown in Fig. 5, the shaft 185 may be slid back and forth in its bearings. A second shaft 195 is mounted in bearings 196 and 197, the former slidable up and down in the posts 182, and the latter mounted in the pivoted end of the arm 200 between the posts 183. A gear 198 on the shaft 195 meshes with the gear 199 on the shaft 185 so that the latter will drive the former. The arm 200 is pivoted on the bolt 201 and is normally lifted by means of the spring 202, and, by means of bolts 204, lifts the bearing 196 and the adjacent end of the shaft 195. The shaft is prevented from moving endwise by the gear 198 and the collar 205. On the outer end of the shaft 195 is a flanging roller 206 and a complimentary roller 207 is mounted on the adjacent end of the shaft 185. The normal positions of the parts with respect to a cam body 27 in the body carrier, are shown in Fig. 37. The shaft 195 is held up out of the path of the can bodies and the shaft 185 and its operative roller 207 is withdrawn out of such path, until the next body is positioned by the body carrier, and the carrier is locked in position as has been described. The shaft 185 is then moved inward to the position shown in Fig. 34, and the bearing 196 is then depressed by the arm 208 of a lever pivoted at 209 as shown in Fig. 36. The other arm 210 of this lever connects to the second bell-crank 212 (Fig. 5) pivoted at 217, by means of a link 213, and this bell-crank connects to the arm 214 by means of the link 216. The arm 214 is secured to the shaft 218, also shown in Fig. 2, which shaft connects to the arm 219 having a roller 220 at its outer end that engages the cam 221 (Fig. 37a), which causes the arm 208 to depress the shaft 195 immediately after the shaft 185 has been advanced. After the can body has been flanged, as indicated in Fig. 34, the arm 214, the bell-crank 212 and arm 210 are raised by the spring 211, and the roller 206 is lifted by means of the spring 202 and bolts 204, and and the roller 207 withdrawn by means of the lever 194. This lever is mounted on the pivot 223 (Fig. 5) carried by the plate 224 (Fig. 1), which, in turn, is mounted on the table. The lower end of this lever connects to the lug 226 on the slide 227, which has a pin 228 engaging in a slot or cam groove 229 in the cam 230 (Fig. 2). At each revolution of the shaft 7 therefore, the flanging mechanism will be brought into operative relation to the can body. At the opposite side of the body carrier is a similar mechanism for beading the opposite ends of the bodies, similar in substantially every detail to that just described, with the exception that the rollers 232 and 233 are so formed that a bead will be formed in the body. See Fig. 38. The shaft 218 has a second arm 234 (Figs. 2 and 3) to cause the upper roller 232 to move up and down, while the lever 235 which corresponds to the lever 194 (Fig. 3) is pivoted at 236 and has a pin 237 at its lower end that engages the cam groove 238 (Fig. 2) in the cam 239. The cam grooves 238 and 229 are opposite each other so that the beading and flanging mechanisms will operate simultaneously.

The body being formed of a sheet bent to cylindrical form with the ends seamed, is of uneven thickness, and this would prevent the body passing freely between the rolls 206 and 207 and might stop the machine, should the rolls be held rigidly. To prevent this, the link 216 may be constructed as shown in Fig. 39, with a sleeve 241 in which the head 242 on the rod 243 is slidable. A collar 244 on the rod 243 closes the end of the sleeve and a spring 245 receives the pull of the rod 243 and transmits it to the sleeve 241.

*Head feeding mechanism.*—At the next actuation of the carrier, the body is moved to the head attaching mechanism, which is non-revoluble and to which the heads are brought by the mechanism shown in Figs. 11, 12, and 17 to 22 inclusive. The parts are designated as the head conveyer, the head feeder, and the head guide.

Figure 19:
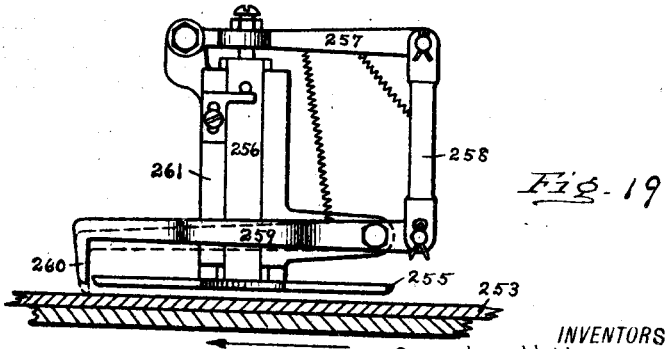

The head conveyer is supported above the heading machine and transversely thereto in any desired manner, preferably absolutely independent thereof, and consists of a frame 250 having bearings 251 at either end for the shafts 252, which carry the conveyer belt 253. A pulley 254 may be used to drive this conveyer. The heads are dropped onto the right end of this belt (Fig. 12) and are carried to the feeder at the left. In case two heads happen to be stuck together, they will engage the plate 255 connected to the bar 256 which is slidable in the bracket 261, (Fig. 19) and raise it and the bar 256 which carries it until said bar engages the lever 257, and thereby lift the outer end of the lever 257 and the link 258, depressing the long arm of the lever 259 and forcing the finger 260 into the path of the two heads, as shown in dotted lines, resulting in a stoppage of the feed or in the throwing of the heads off the belt while the weights of the parts 257 and 258 will normally hold up the finger 260, springs may be added as shown in Fig. 19. A bracket 261 supports this mechanism. The plate 255 may have a notch 262 (Fig. 18) so that the operator can pick out the heads that are retarded. Immediately beyond this safety device, guides 264 and 265 are secured to the frame and brackets 266 having cross pieces 267 carry bolts 268 which have bars 269 at their lower ends. These bars are spaced such a distance from the belt 253 that the heads 270 are prevented from moving in any but the right direction and from climbing over each other.

The head feeder is positively returned to normal position but is spring actuated. Referring to Fig. 1, the head securing mechanism is shown to have a reciprocating ring 274 which is moved back and forth at each revolution of the cam shaft, and a stationary housing 275, both of which will hereafter be more fully described and which are also shown in Fig. 20. An arm 276 is pivoted on the housing 275, while a second arm 277, secured to the ring 274, connects to the arm 276 by means of the link 278 and thereby swings the arm 276 back and forth. The upper end of the arm 276 engages the bolt 279 which is slidable in a slot 280 in the plate 282 which projects from the head conveyer, and which supports the head feeder. This feeder is in the form of a plate 283 having a slot 284 for the guide bolt 285, and having a cross plate 286 at its outer end to connect to the springs 287 which also connect to the conveyer frame, as shown in Figs. 11 and 20 and which normally move the feeder plate 283 forward. At the inner end of the plate 283 is an adjustable end member 288, carried on the screws 289, in order that it may be properly positioned to engage the head 270 on the belt 253 and move it to the position shown in dotted lines in Fig. 17, where it will fall down the chute 290.

Mounted on the plate 14 is a housing 292 for the head securing mechanism, and from it, the bracket 293 extends upwardly, as shown in Fig. 20. This bracket carries a shaft 294 on which is mounted the bent plate 295 which is adapted to swing into the path of the can bodies. As each body engages the lower inclined edge of this plate, the plate will be swung back and the lever 296 on the shaft 294 will be swung up, pushing up the link 297 against the pull of the spring 298. This link connects to the arm 299 of a lever pivoted at 300, whose other arm 302 has a shoulder 303 adapted to normally lie in the path of the lip 304 on the feeder plate 283. At each revolution of the cam shaft, the body carrier turns one step and carries a body one half of the distance from the flanging to the head attaching mechanism. At this point the can body engages the plate 295 (Fig. 5) and thereby holds the shoulder 303 on the lever arm 302 out of the path of the lip 304 on the feeder plate 283, and permits the feeder plate to move another head to the position shown in dotted lines in Fig. 17, whence it will fall down the chute to proper position to be secured to the body at the next actuation of the mechanism. But if no can body is present to be engaged by this plate 295, the spring 298 will swing up the arm 302, and the shoulder 303 into the path of the lip 304, and thus prevent a head falling down the chute 290. This prevents a head being operated upon when there is no body present.

*Head attaching mechanism.*—The can head falls down the chute 290 at about the time that the head attaching mechanism is at the operative or forward end of its movement and rests on the plunger 310 on the shaft 311. See Figs. 1, 5 and 40 to 47 inclusive. The shaft 311 is slidable in a sleeve 312, which, in turn, is slidable in the housing 275 which is mounted on the plate 14. Referring to Fig. 5, a lever 313 will be seen pivoted at 314 on the plate 224. The lower end of this lever connects to a link 315 (Fig. 4) which, in turn, connects to the lever 316 which is pivoted at 317. This lever 316 carries a roller 318 (Fig. 2) that engages the face-cam 319, and is swung out thereby at each revolution of the cam shaft during the time the body carrier is stationary. As shown in Figs. 41 and 45, the lever 313 may connect to the sleeve 312 by means of the red shaft 320, the sleeve 222 and the pin 323. A spring 324 within the sleeve 312 normally holds the shaft 313 outward, while a key 325, slidable in the slot 326, prevents the shaft turning within the sleeve. The ring 271 is secured to the sleeve 312. Pairs of lugs 328 on the plunger 310 carry the levers 329, each of which has a tooth 330 on its outer end to engage the flange of the can head, and an adjusting screw 332 on its inner end to engage the cam collar 333 on the outer end of the sleeve 312. Springs 334 hold the outer ends of these levers normally outward. When the can head comes down the chute, it rests on the plunger 310 until the plunger is withdrawn, whereupon the head falls to the position shown in Figs. 45 and 47, resting within the housing 292 between the fingers 336 and plates 337 carried by the guides 338 and normally held inwardly by the springs 315. When the sleeve 312 is now moved forward, the plunger 310 engages the inclined faces of these fingers 336 and pushes the plates 337 back, thus releasing the head and moving it from the position shown in solid to that shown in dotted lines in Fig. 45, the head being supported by the bracket 339 shown in Figs. 40 and 47. A small lever 340 prevents the can head from jumping up out of position, which lever is pivoted at 341 on the housing 292. As will be seen in Figs. 45 and 46, the head has a central depressed portion into which the plunger 310 may fit. This forward movement of the head carries it over the end of the waiting can body. The outward movement of the plunger 310 and of the levers 329 is limited by the can body in the body carrier, and to make sure that there shall be no longitudinal movement, a semi-circular plate 240 is mounted on the table 13, as shown in Figs. 1 and 3, against which the opposite ends of the bodies may slide. The plunger 310 and the pivots of the levers 329 being stopped, continued movement of the sleeve 312 and of the cam collar 333 will swing out the rear ends of these levers and force the teeth 330 on the outer ends toward each other, thereby bending in the flange on the can head at four points around the flange on the body as indicated in Fig. 46. The next movement of the lever 313 will permit all parts to return to place, as shown in Fig. 45, and permit the head that has been resting on the plunger 310 to fall into position for the next body. The carrier is then released and actuated, moving the body and head away from the head attaching mechanism, and another body and head to the first seaming mechanism.

*The seaming mechanisms.*—The first seaming mechanism receives a body 27 having a flange 345 and a head 276 having a downturned flange 346 which has been pushed inward at a few points by the teeth 330, as indicated in Fig. 52. It first straightens the flanges and then bends the flange 346 down to the position indicated in Fig. 50. The can then passes to the second seaming mechanism which bends down the flanges as shown in Fig. 56, after which the can passes out of the machine.

Referring to Fig. 1, bearings 350 are seen mounted on the plate 14 and supporting the sleeve 351, which sleeve carries a sprocket 352 between these bearings. A chain 353 runs on a proper wheel on the shaft 18 as indicated in Fig. 4. Within the sleeve, but not revoluble therewith, is a shaft 354, whose rear end is threaded and adjustably secured in the forked sleeve 355 which is slotted to receive the pin 356 carried by the upper end of the lever 357. The lever is pivoted on a bracket 358 carried by the plate 224, and its lower end connects to the slide 227 shown in Fig. 5. A spring 359 prevents undue pressure being asserted against the can head in line with the sleeve 351. Collars 360 and 361 prevent the sleeve 351 sliding on the shaft 354. The sleeve may be fitted with internal cylindrical bearings 363. A collar 364 may screw onto the outer end of the sleeve 351. Secured to the outer end of the sleeve 351 by means of the screws 365 are two curved plates 366 which hold the jaws 367 in position, longitudinal movement of the jaws being prevented by the pins 368. Mounted between the jaws on the pins 369 are levers 370 having seaming rollers 371 on their outer ends, revoluble between the nuts 372. The rear ends of the levers have arms 373 pivoted to them, which arms carry rollers 374 adapted to engage the cam 375, screws 376 serving to adjust the relative positions of the rollers 374 and 371. A ring 377 is loose on the cam 375 and has bolts 378 which pass through eyes in the upper end of the lever 379. This lever is pivoted on the plate 380 projecting upward from the table 13 under the plate 14, and the lower end of the lever is connected between the lugs 381 on the yoke 384 (Fig. 2). This yoke has sleeves 385 at its ends which are slidable on the rods 386 between cross beams 9. A pin 387 extends down in a groove 388 in the cam 389, whereby the yoke 384 and lever 379 are actuated to slide the cam 375 back and forth on the sleeve 351 to move the rollers 371 toward each other. As the sleeve 351 revolves at considerable speed, centrifugal force is sufficient to separate these seaming rollers.

In order that the seaming rollers may act properly, it is necessary that the flanges 345 and 346 be radial and in contact. To insure this, the plates 366 are provided with arms 392, which carry pins 393 on which the rollers 394 are mounted, whose cylindrical portions 395 and grooved faces 396 are admirably adapted to perform this work, as indicated in Fig. 52. The cam 389 is so positioned that it acts shortly after the cam 390 which moves the lever 357.

When the can head and body have been presented in line with the shaft 354 and the carrier locked in position, the upper end of the lever 357 moves forward and carries the collar 361 against the head and at the same time brings the portions 395 and 396 of the rollers 394 against the edge of the head, as shown in Fig. 52. Immediately thereafter the lever 379 moves the cam 375 forward to swing the seaming rollers 371 into action, as shown in Fig. 56, resulting in the flange 346 being bent flat against the flange 345. The operative portions of the rollers 371 are doable so that the rollers may be reversed on their pins when worn. After a few revolutions of the rollers 371, the seaming is completed and the upper ends of the levers 357 and 379 move back to free the united head and body. Because of the pressure between the collar 361 and the head, they sometimes adhere, owing perhaps to the entire exclusion of air between them, so that when the collar is withdrawn, the can tends to move with it. To prevent this the small pins 398 (Fig. 55) may be mounted in the collar 361, and normally held outward by the springs 399, held in place by the screws 400. When the collar 361 is pressed against a can head, the pins 398 are pressed in against the springs, but when the shaft 354 moves back, the pins 398 prevent the can from following.

The second seaming mechanism is substantially identical in construction with the first, excepting the form of the rollers 405, as shown in Fig. 56. The grooves 406 in these rollers are rounded and shallow and bend the lapping portions of the body and head from the form shown in Fig. 50 to that shown in Fig. 56. The other parts are given the same reference characters as in the first seaming mechanism and have the same functions.

The curved plate 240 supports sleeves 420 (Figs. 1 and 3) in which are mounted the plungers 421 connected by a bar 422. These plungers are pressed inward at each seaming operation against the can bodies and hold them in proper position so that the seaming rollers cannot move the bodies while bending down the flanges. The bar 422 is carried by a slidable shaft 424 having a forked end 425 to which the upper end of the lever 426 connects. This lever is pivoted at 427 (Fig. 3), and has a pin 428 which enters the cam slot 429 in the cam 239. See Fig. 2. The shaft 424 has a groove 430 into which the lower end of the screw 431 engages, which screw is carried by the pedestal 432 that supports the shaft 424. The plungers have grooves 434 to engage the can bodies as shown in Fig. 1ª to hold them from turning and for rounding them properly.

*The sealing mechanism.*—It is sometimes desirable to fill the narrow groove within the can between the head and body with a cement that is insoluble in the future contents of the can. This is preferably done immediately after the seaming is completed and in the present machine, a device is mounted in such position that the sealing material will be applied at the next step after the second seaming by squirting the same in the form of a spray into the can against the bottom from a nozzle positioned just outside of the open end of the can.

Referring to Figs. 1, 2, 3 and 57 to 63 inclusive, a cam 435 is seen mounted on the shaft 7 and engaging the roller 436 on the end of the lever 437, connected to the sleeve 438 on the shaft 145, from which sleeve an arm 439 extends. A bracket 440 is mounted on the table 13 and supports the cement container, which consists of the connected cylinders 442 and 443 having a cap 444. Brackets 445 on this cap support a small shaft 446, to which are secured the arms 447 that connect to an upright rod 448 on the outside of the container, and the arm 449 that extends between the collars 450 and 451. (Fig. 63) on the upper end of the piston 453. The lower end of the rod 448 is guided by a small bracket 454 and has a tooth 455. A removable closure 456 permits filling of the container.

A short shaft 458 is mounted in a bearing on the cylinder 442 and has an arm on each end; the arm 459 extending up and engaging the rod 460 that connects to the arm 439 (Fig. 61) and has a tooth 461 adapted to engage the tooth 455 on the rod 448, and the arm 462 which extends down between the ring 21 of the can carrier and the semicircular plate 240. See Figs. 5 and 61. So long as a can body is in the carrier at the point A, Fig. 61, the lower arm 462 will rest against the can body and be held out, thereby causing the tooth 461 to engage the tooth 455 as shown in solid lines in Fig. 61. But if a can is missing, the arms will swing to the positions indicated in dotted lines and the up and down movements of the arm 439 will have no effect. Should the engagement occur, the rods 460 and 448 will move from the position shown in solid lines in Fig. 62 to that shown in dotted lines and the parts shown in Fig. 63 will be similarly moved so that the piston 453 will be forced down.

Extending up into the bottom of the cylinder 442 is a sleeve 464 having a bore to fit the lower end of the piston 453 and an opening 465 to permit the contents of the container to flow into this bore. A sleeve 466 connects to this sleeve 464 and has a cap 467 at one end and a nozzle 468 at the other. Slidable within the lower sleeve is a plunger 469 having nuts 470 and 471 at its inner end, the latter being machined to fit the bore of the sleeve, the plunger having grooves 473 so that the liquid cement may flow freely along the plunger within the spring 474. The outer end 475 of the plunger is conical and adapted to fit the flaring mouth 476 of the nozzle 468. The operation of this device is as follows: When a can reaches the position A in Fig. 61, the cam 435 swings up the arm 437 and depresses the piston 453, forcing the contents of the bore of the sleeve 464 into the grooves 473 and causing the plunger 469 to move outwardly, until the contents are discharged between the edges of the flaring mouth 476 and the conical end 475 of the plunger. The liquid cement will be discharged against the inside and bottom of the can, but principally where the two join, and fill the groove between them. After the high portion 477 of the cam has passed the roller 436, the spring 478 will be permitted to raise the piston 453, which will relieve the pressure in the sleeve 466 sufficiently to permit the spring 474 to pull back the plunger 469 and thus permit the end 475 to close the mouth 476. The contents of the container will flow into the bore of the sleeve 464 through the hole 465. If there is no can into which the cement can be injected, the connection between the teeth 455 and 461 will be permitted to break by the arm 462 swinging down and the arm 457 and rod 460 swinging outward. The pulley 174 may be rigidly secured to the shaft 18, but for better control, we prefer to use a clutch 470 and clutch lever 471 to make this connection.

The general construction shown has been found operative under adverse circumstances, particularly when both heads and bodies are of stiff and thick metal.

The details of the machine may all be changed in order to meet different requirements without departing from the spirit of our invention.

The safety and adjusting devices common to machines of this general type have been omitted from the drawings for the sake of simplicity and clearness.

The many omitted details necessary to the completion of the machine can be supplied by any mechanic skilled in the art of can making without further instruction.

We claim:

1. In a machine for securing heads to the bodies of cans, the combination of a frame, a main shaft mounted thereon, a can body carrier mounted on said main shaft and comprising a pair of disks having pockets in their peripheries to receive can bodies, pairs of movable jaws mounted between said disks and having inwardly extending projections, a cam to force each pair of said jaws together to grip the can bodies, plungers to move said cams, and a cam-faced disk mounted on said main shaft against which the inner ends of said plungers contact in succession in order to be thrust outwardly to cause the jaws to move to their closed position.

2. In a machine for securing heads to the bodies of cans, the combination of a main frame, a main shaft mounted thereon, a can carrier mounted concentric with said main shaft and comprising a pair of annular plates having pockets in their peripheries, a pair of can body gripping devices mounted between said plates at each pocket and adapted to engage the can bodies and hold them securely while the heads are being attached, a stationary cam mounted concentric with said main shaft and engaging the main parts of said can gripping devices, a slide on said cam to force the can-body gripping devices to operative position in succession, a cam shaft mounted below the main shaft, means mounted on said cam shaft to operate said slide, and means connecting said cam shaft and said can-body carrier for turning said carrier step by step to bring the pockets successively to can receiving position.

2. In a machine for securing heads to the bodies of cans, the combination of a frame, a main shaft revoluble thereon, a sleeve loosely mounted on said shaft and having a pair of notched disks intermediate its ends and having a third disk at one end, a can carrier mounted on said third disk and comprising a pair of annular plates formed with pockets in their peripheries, can-body gripping devices mounted between said plates, one for each pair of pockets, a stationary cam mounted concentric with said shaft and engaged by said can-body gripping devices for controlling the operation of the same, a reciprocating member engaging one of the notched disks on said sleeve, means to reciprocate said member to turn said sleeve and can-body carrier step by step, and means to engage the other notched disks to lock the same and the can-body carrier at the end of each step.

3. In a machine for securing heads to the bodies of cans, the combination of a frame, a main shaft revolubly mounted thereon, a sleeve loosely mounted on said shaft, a pair of notched disks connected to said sleeve intermediate its ends, a lever mounted on said sleeve adjacent one of said disks, a pawl carried by said lever to engage the adjacent disk to turn the same, a cam shaft below the main shaft and means to revolve the same, a cam on said cam shaft, means whereby said cam may actuate said lever and pawl, a locking mechanism adjacent said second disk and comprising a tooth adapted to enter notches in said disk, a cam on said cam shaft to actuate said locking mechanism, a pair of rings mounted on said sleeve and provided with pockets, and jaws mounted between the rings to engage can bodies.

4. In a machine for securing heads to the bodies of cans, the combination of a frame, a main shaft and a cam shaft mounted on said frame, a can carrier mounted on said frame concentric with the main shaft and comprising a sleeve and a pair of rings having pockets in their peripheries, a pair of jaws mounted between the rings at each pocket, a cam mounted concentric with the rings to cause the jaws to close, means to turn the can carrier step-by-step, and means to lock said carrier after each movement.

5. In a machine for securing heads to the bodies of cans, the combination of a frame, a main shaft and a cam shaft mounted on said frame, a can carrier mounted on said frame concentric with the main shaft and comprising a sleeve and a pair of rings having pockets in their peripheries, a pair of jaws mounted between the rings at each pocket, a cam mounted concentric with the rings to cause the jaws to close, means to turn the can carrier step-by-step, means to lock said carrier after each movement, a disk on said sleeve, and a brake to engage the disk previous to the operation of the locking mechanism.

7. In a machine for securing heads to the bodies of cans, the combination of a frame, a main shaft and a cam shaft mounted on said frame, a can carrier mounted on said frame concentric with the main shaft and comprising a sleeve and a pair of rings having pockets in their peripheries, a pair of jaws mounted between the rings at each pocket, a cam mounted concentric with the rings to cause the jaws to close, means to turn the can carrier step-by-step, means to lock said carrier after each movement, a disk on said sleeve, a brake to engage the disk, a cam on the cam shaft, and connections between the cam and the brake for actuating the brake just previous to the operation of the locking mechanism.

8. In a machine for securing heads to the bodies of cans, the combination of a frame, a main shaft mounted on said frame, a can carrier mounted on the frame concentric with the main shaft and comprising a sleeve, a pair of rings having pockets in their peripheries, a pair of jaws mounted between the rings at each pocket, an actuating mechanism to turn the carrier step by step, and a locking mechanism to engage the carrier after each step.

9. In a machine for securing heads to the bodies of cans, the combination of a frame, a main shaft mounted on said frame, a can carrier mounted on the frame concentric with the main shaft and comprising a sleeve, a pair of rings having pockets in their peripheries, a pair of jaws mounted between the rings at each pocket, an actuating mechanism to turn the carrier step by step, a locking mechanism to engage the carrier after each step, and means to check the movement of the carrier previous to locking it.

10. In a machine for securing heads to the bodies of cans, the combination of a frame, a shaft mounted thereon, a can body carrier mounted on the shaft, means for revolving the carrier upon the shaft, said carrier comprising a member having pockets therein to receive can bodies, a pair of jaws attached to the member, one of the jaws being movable, a cam for engaging with the movable jaw to force it toward the other jaw, a plunger to move the cam, and a second cam against which the plunger contacts as the carrier revolves about the shaft, thereby causing the plunger to move the movable jaw toward the other jaw.

11. In a machine for securing the heads to the bodies of cans, the combination of a carrier for flanged can bodies, means to move the carrier step by step, a chute for flanged heads of the cans, a longitudinally slidable shaft for moving the heads out of the chute and onto the ends of the cans, a plurality of levers pivoted to said shaft and having inturned outer ends, a sleeve slidable on said shaft, a cam on the sleeve adapted to engage the inner ends of the levers to force the inturned ends toward each other into engagement with the flanges on the can heads to bend said flanges over the flanges on the bodies, and means to move the shaft and sleeve longitudinally.

12. In a machine for securing the heads to the bodies of cans, the combination of a carrier for flanged can bodies, means to move the carrier step by step, a housing, a pair of oppositely disposed plates mounted on the housing and having fingers with rearwardly inclined faces, means for supplying flanged heads and permitting them to lodge in said housing between the plates and the fingers thereon, a longitudinally movable shaft adapted to engage said fingers and to move them and the plates back and the can-head outward over a can body, levers mounted on said shaft and having inturned fingers on their outer ends, a sleeve slidable on said shaft, a cam on said sleeve adapted to engage the inner ends of the levers to force the outer ends together to bend the flange on the head around the flange on the body, and levers to slide the shaft and sleeve independent of each other.

13. In a machine for securing heads to the bodies of cans, the combination of a frame, a shaft mounted thereon, a can body carrier mounted on the shaft, means for revolving the carrier upon the shaft, said carrier comprising a pair of disks having pockets in their peripheries to receive can bodies, a pair of jaws mounted between the disks, one of the jaws being movable, a cam for engaging with the movable jaw to force it toward the other jaw, a plunger to move the cam, and a stationary cam against which the plunger contacts as the carrier revolves about the shaft, thereby causing the plunger to move the movable jaw toward the other jaw.

14. In a machine for securing heads to the bodies of cans, the combination of a frame, a shaft mounted thereon, a can body carrier mounted on the shaft, means for revolving the carrier upon the shaft, said carrier comprising a pair of disks having pockets in their peripheries to receive can bodies, a pivot connected to one of the disks, a pair of jaws one of which is mounted to swing about the pivot, a cam for engaging with the pivoted jaw to force it toward the other jaw, a plunger for moving the cam, and a stationary cam with which the plunger contacts as the carrier revolves about the shaft to cause the plunger to be thrust outwardly and to thereby move the pivoted jaw toward the other jaw.

15. In a machine for securing heads to the bodies of cans, the combination of a frame, a shaft mounted thereon, a can body carrier mounted on the shaft, said carrier comprising a disk having pockets to receive the cans, means to revolve the carrier upon the shaft, a pivot secured to the disk, a pair of jaws upon the carrier, one of the jaws being mounted to swing on the pivot, a cam for engaging with the pivoted jaw to force it toward the other jaw, a plunger to move the cam, and relatively stationary means with which the plunger contacts as the carrier revolves about the shaft to cause the plunger to be thrust outwardly and to thereby move the pivoted jaw toward the other jaw.

16. In a machine for securing heads to the bodies of cans, the combination of a frame, a shaft mounted thereon, a can body carrier mounted on the shaft, means to impart angular movement to the carrier, said carrier comprising a pair of disks, a pair of jaws mounted between the disks, one of the jaws being movable, a cam for engaging with the movable jaw to force it toward the other jaw, a plunger to move the cam, resilient means for cushioning the thrust of the cam upon the movable jaw, and a relatively stationary cam with which the plunger contacts as the carrier moves about the shaft, thereby imparting motion to the plunger and moving the movable jaw toward the other jaw.

17. In a machine for securing heads to the bodies of cans, the combination of a frame, a shaft mounted thereon, a can body carrier mounted on the shaft, means to impart angular movement to the carrier, said carrier comprising a disk, a pivot secured to the disk, a pair of jaws supported on the disk, one of the jaws being mounted to swing about the pivot, a cam for engaging with the pivoted jaw to force it toward the other jaw, a plunger to move the cam, resilient means for cushioning the thrust of the cam upon the pivoted jaw, and a relatively stationary cam with which the plunger contacts as the carrier moves about the shaft, thereby imparting motion to the plunger and swinging the pivoted jaw toward the other jaw.

18. In a machine for securing heads to can bodies, the combination of a frame, a shaft mounted thereon, a can body carrier mounted on the shaft, means for imparting intermittent angular motion to the carrier, a pair of jaws mounted upon the carrier, one of the jaws being movable, a cam for engaging with the movable jaw to force it toward the other jaw, a plunger to move the cam, a stationary cam with which the plunger co-acts as the carrier moves about the shaft, thereby moving the movable jaw toward the other jaw to retain a can body on the carrier, a movable member carried by the stationary cam, means to move the member to engage with the plunger and thereby firmly grip the can body between the jaws at a predetermined time, and means for applying a head to the body while it is firmly gripped by the jaws.

19. In a machine for securing heads to can bodies, the combination of a frame, a shaft mounted thereon, a can body carrier mounted on the shaft, means for imparting intermittent angular motion to the carrier, a pivot secured to the carrier, a pair of jaws on the carrier, one of the jaws being mounted upon the pivot, a cam for engaging with the pivoted jaw to force it toward the other jaw, a plunger to move the cam, a stationary cam with which the plunger co-acts as the carrier moves about the shaft, thereby swinging the pivoted jaw toward the other jaw to retain a can body on the carrier, a movable member carried by the stationary cam, means to move the member to engage with the plunger and thereby firmly grip the cans between the jaws at a predetermined time, and means for applying a head to the body while it is firmly gripped by the jaws.

20. In a machine for securing heads to can bodies, the combination of a frame, a shaft mounted thereon, a can body carrier mounted on the shaft, means for imparting angular motion to the carrier, means for moving one of the jaws toward the other, a plunger for actuating the means, a resilient cushion between the plunger and the jaw-moving means, a stationary cam with which the plunger coacts as the carrier moves about the shaft, thereby moving the movable jaw toward the other jaw to retain a can-body on the carrier, a movable member adapted to engage with the plunger and thereby firmly grip the can-body between the jaws at a predetermined time, and means for applying a head to the body while it is firmly gripped by the jaws.

21. In a machine for securing heads to can bodies, the combination of a frame, a shaft mounted thereon, a can body carrier mounted on the shaft, means for imparting intermittent angular motion to the carrier, a pair of jaws mounted on the carrier, means for moving one of the jaws toward the other, a plunger for actuating the means, a stationary cam with which the plunger co-acts as the carrier moves about the shaft to cause the jaws to retain a can body upon the carrier, a movable member adapted to engage with the plunger, means for moving the member into engagement with the plunger while the carrier is stationary to thereby firmly grip the can body between the jaws, and means for applying a head to the body while it is firmly gripped by the jaws.

22. In a machine for securing the heads to the bodies of cans, the combination of a carrier for flanged can bodies, means to move the carrier step-by-step, a housing, a plate movably mounted in the housing, a finger connected to the plate and spaced apart therefrom to form an opening wherein a can head may rest, a longitudinally movable shaft adapted to engage the finger to move it and the plate laterally and the can head outwardly over a can body on the carrier, a lever mounted on the shaft, and means for swinging the lever as the shaft approaches the forward end of its stroke, whereby one of its ends engages with the flange on the head and bends it over the flange on the can body.

23. In a machine for securing the heads to the bodies of cans, the combination of a carrier for flanged can bodies, means to move the carrier step-by-step, a housing, a plate movably mounted in the housing, a finger connected to the plate and spaced apart therefrom to form an opening wherein a can head may rest, an inclined surface on the finger, a longitudinally movable shaft, means moving with the shaft for engaging with the inclined surface on the finger to move it and the plate laterally, and for thereafter forcing the can head outwardly over a can body on the carrier, a lever mounted on the shaft, and means for swinging the lever as the shaft approaches the forward end of its stroke, whereby one of its ends engages with the flange on the head and bends it over the flange on the body.

24. In a machine for securing the heads to the bodies of cans, the combination of a carrier for flanged can bodies, means to move the carrier step by step, means for holding a flanged can head in alinement with a can body on the carrier while the carrier is stationary, a longitudinally movable shaft, means on the shaft for releasing the can head from the holding means and for moving it outwardly over the can body, a lever carried by the shaft, means for moving the lever as the shaft approaches the forward end of its stroke, whereby one of its ends engages with the flange on the head and bends it over the flange on the body, and means for varying the movement of the lever.

25. In a machine for securing the heads to the bodies of cans, the combination of a carrier for flanged can bodies, means to move the carrier step by step, means for holding a flanged can head in alinement with a can body on the carrier while the carrier is stationary, a longitudinally movable shaft, means on the shaft for releasing the can head from the holding means and for moving it outwardly over the can body, a lever carried by the shaft, means for moving the lever as the shaft approaches the forward end of its stroke, whereby one of its ends engages with the flange on the head and bends it over the flange on the body, means for varying the movement of the lever, and means for moving the lever in the opposite direction as the shaft returns to its original position.

26. In a machine for securing heads to the bodies of cans, the combination of a frame, a can carrier mounted on the frame, said carrier comprising means for receiving can bodies, an actuating mechanism for moving the carrier step-by-step, a locking mechanism to engage the carrier after each step, and cam-operated means for checking the movement of the carrier at each step previous to the time the locking mechanism becomes operative for the purpose of locking it.

27. In a machine for securing heads to the bodies of cans, the combination of a frame, a can carrier mounted on the frame, said carrier comprising means for receiving can bodies, an actuating mechanism for moving the carrier step-by-step, a locking mechanism for engaging the carrier after each step, and cam-operated means for frictionally engaging with and checking the movement of the carrier at each step previous to the time the locking mechanism becomes operative for the purpose of locking it.

28. In a machine for securing heads to the bodies of cans, the combination of a frame, a can carrier mounted on the frame, said carrier comprising means for receiving can bodies, an actuating member for moving the carrier step-by-step, a locking mechanism to engage the carrier after each step, and a swinging cam-operated member provided with a face for frictionally engaging with the carrier and checking the movement thereof at each step previous to the time the locking mechanism becomes operative for the purpose of locking it.

29. In a machine for securing heads to the bodies of cans, the combination of a frame, a can carrier mounted on the frame, said carrier comprising means for receiving can bodies, an actuating member for moving the carrier step-by-step, a locking mechanism to engage the carrier after each step, a movable member provided with a face for frictionally engaging with the carrier, resilient means normally holding the member out of engagement with the carrier, and means for causing the member to engage with the carrier and check the movement thereof at each step previous to the time the locking mechanism becomes operative for the purpose of locking it.

30. In a machine for securing heads to the bodies of cans, the combination of a frame, a can carrier mounted on the frame, said carrier comprising means for receiving can bodies, an actuating member for moving the carrier step-by-step, a locking mechanism to engage the carrier after each step, a movable member provided with a face for frictionally engaging with the carrier, resilient means normally holding the member out of engagement with the carrier, and cam-operated means for causing the member to engage with the carrier and check the movement thereof at each step previous to the time the locking mechanism becomes operative for the purpose of locking it.

31. In a machine for securing heads to the bodies of cans, the combination of a frame, a can carrier mounted on the frame, said carrier comprising means for receiving can bodies and a disk, an actuating member for moving the carrier step-by-step, a locking mechanism to engage the carrier at the end of each step, a pair of movable members for frictionally engaging with the disk on opposite sides thereof, resilient means normally holding the movable members out of engagement with the carrier, and means for causing the movable members to engage with the disk and check the movement thereof at each step previous to the time the locking mechanism becomes operative for the purpose of locking the carrier.

32. In a machine for securing the heads to the bodies of cans, the combination of a carrier for flanged can bodies, means to move the carrier step-by-step, a housing, a plate mounted in the housing, a member secured thereto, said member being provided with an inclined face, means for supplying flanged heads and permitting them to lodge between the plate and the member, a longitudinally movable shaft adapted to engage the inclined face on the member and to move it and the plate back and the can-head outwardly over the can body, a lever mounted on said shaft and having an inturned finger on its outer end, a sleeve movable on the shaft, means on the sleeve for engaging with the lever to move the outer end thereof to bend the flange on the head around the flange on the body, and means to move the shaft and sleeve independently of each other.

33. In a machine for securing the heads to the bodies of cans, the combination of a carrier, means for imparting intermittent movement to the carrier, a plurality of elements on the carrier each adapted to hold a flanged can body, a head-applying member with which the elements successively come into alinement, a chute for supplying heads to the head-applying mechanism, a feeder for supplying heads to the chute, said feeder being movable from a feeding to a discharging position, means tending to move the feeder to discharging position, means for normally returning the feeder to the receiving position at each step of the movement of the can body carrier, said means comprising a stationary housing, an arm pivoted thereto, a reciprocating member, a link pivoted to the reciprocating member and to the arm, means for locking the feeder in the receiving position, and means controlled by the can bodies on the carrier for releasing the locking means to allow the feeder to deliver a head to the chute.

34. In a machine for securing the heads to the bodies of cans, the combination of a carrier, means for imparting intermittent movement to the carrier, a plurality of elements on the carrier each adapted to hold a flanged can body, a head-applying member with which the elements successively come into alinement, a chute for supplying heads to the head-applying mechanism, a feeder for supplying heads to the chute, said feeder being movable from a feeding to a discharging position, means tending to move the feeder to discharging position, means for normally returning the feeder to the receiving position at each step of the movement of the can body carrier, said means comprising a stationary housing, an arm pivoted thereto, a reciprocating member, a link pivoted to the reciprocating member and to the arm, a locking member having a shoulder thereon that engages with and locks the feeder in receiving position, and means controlled by the can bodies on the carrier for releasing the locking member from engagement with the feeder to allow the feeder to deliver a head to the chute, said releasing means comprising a pivoted member, one end of which is in the path of the can bodies, a link connecting the pivoted member and the locking member, and a spring for normally holding the locking member in the feeder-engaging position.

35. In a machine for securing the heads to the bodies of cans, the combination of a carrier, means for imparting intermittent movement to the carrier, a plurality of elements on the carrier each adapted to hold a flanged can body, a head-applying member with which the elements successively come into alinement, a chute for supplying heads to the head-applying mechanism, a feeder for supplying heads to the chute, said feeder being movable from a feeding to a discharging position, means tending to move the feeder to discharging position, means for normally returning the feeder to the receiving position at each step of the movement of the can body carrier, a pivoted locking member for locking the feeder in the receiving position, and means for releasing the locking member from locking engagement with the feeder to allow the feeder to move to discharging position, said lock-releasing means comprising a pivoted member one end of which is in the path of the can bodies, a link connecting the last-mentioned pivoted member and the pivoted locking member, and a spring for normally holding the pivoted locking member in the feeder engaging position.

In testimony whereof we have signed this specification in the presence of two subscribing witnesses.

CHARLES H. HOOKEY.
SAMUEL HOOKEY.

Witnesses:
P. F. KELLY,
JOHN F. McINERNEY.